United States Patent
Azuma et al.

(10) Patent No.: US 12,516,514 B2
(45) Date of Patent: Jan. 6, 2026

(54) DEFECATION RECORDING SYSTEM, DEFECATION RECORDING METHOD AND DEFECATION RECORDING PROGRAM

(71) Applicant: TOTO LTD., Kitakyushu (JP)

(72) Inventors: Kensuke Azuma, Fukuoka (JP); Taihei Tanaka, Fukuoka (JP)

(73) Assignee: TOTO LTD., Fukuoka (JP)

( * ) Notice: Subject to any disclaimer, the term of this patent is extended or adjusted under 35 U.S.C. 154(b) by 132 days.

(21) Appl. No.: 17/277,858

(22) PCT Filed: Aug. 28, 2020

(86) PCT No.: PCT/JP2020/032754
§ 371 (c)(1),
(2) Date: Mar. 19, 2021

(87) PCT Pub. No.: WO2021/040020
PCT Pub. Date: Mar. 4, 2021

(65) Prior Publication Data
US 2022/0178126 A1    Jun. 9, 2022

(30) Foreign Application Priority Data

Aug. 30, 2019  (JP) ................................ 2019-159041
Aug. 24, 2020  (JP) ................................ 2020-141138

(51) Int. Cl.
*E03D 11/02*    (2006.01)
*A61B 10/00*    (2006.01)

(52) U.S. Cl.
CPC .......... *E03D 11/02* (2013.01); *A61B 10/0038* (2013.01)

(58) Field of Classification Search
CPC ...... A61B 10/0038; A61B 10/00; A47K 17/00
See application file for complete search history.

(56) References Cited

U.S. PATENT DOCUMENTS

2005/0027208 A1   2/2005 Shiraishi et al.
2015/0294549 A1  10/2015 Ribble
(Continued)

FOREIGN PATENT DOCUMENTS

CN    1575777    2/2005
CN    106567435    4/2017
(Continued)

OTHER PUBLICATIONS

International Search Report and Written Opinion for International Application No. PCT/JP2020/032754 mailed on Oct. 20, 2020, 8 pages.
(Continued)

*Primary Examiner* — Natalia Levkovich
(74) *Attorney, Agent, or Firm* — Amin, Turocy & Watson, LLP

(57) ABSTRACT

A defecation recording system according to an embodiment includes: a toilet bowl which is installed in a toilet room; a user identification device which identifies a user who uses the toilet bowl; a detection device which detects feces discharged into the toilet bowl; a determination device which determines a property of the feces from a detection result of the detection device; a clocking device which acquires time information indicating date and time of detection of the detection device; a recording device which records the property of the feces and the time information as personal data in association with the user identified by the user identification device; and a display device which displays information regarding the feces based on the personal data recorded in the recording device.

7 Claims, 14 Drawing Sheets

(56) References Cited

U.S. PATENT DOCUMENTS

| | | |
|---|---|---|
| 2017/0202503 A1 | 7/2017 | Nakanishi et al. |
| 2017/0260728 A1* | 9/2017 | Hall .......................... E03D 9/08 |
| 2017/0303901 A1 | 10/2017 | Sekine |
| 2017/0370936 A1* | 12/2017 | Hasegawa .......... G01N 33/0044 |
| 2018/0368818 A1 | 12/2018 | Oguri et al. |

FOREIGN PATENT DOCUMENTS

| | | |
|---|---|---|
| CN | 106574920 | 4/2017 |
| CN | 206282417 | 6/2017 |
| CN | 107209172 | 9/2017 |
| JP | 07-114596 | 5/1995 |
| JP | 07-216963 | 8/1995 |
| JP | 10-5181 | 1/1998 |
| JP | 2000-140044 | 5/2000 |
| JP | 2002-259645 | 9/2002 |
| JP | 2005-332324 | 12/2005 |
| JP | 2006-61296 | 3/2006 |
| JP | 2007-286912 | 11/2007 |
| JP | 2008-54835 | 3/2008 |
| JP | 2010-220761 | 10/2010 |
| JP | 2014-031655 | 2/2014 |
| JP | 2016-85673 | 5/2016 |
| JP | 2016-145809 | 8/2016 |
| JP | 2016-145811 | 8/2016 |
| JP | 2017-137707 | 8/2017 |
| JP | 2017-137708 | 8/2017 |
| JP | 6209696 | 10/2017 |
| JP | 2018-146244 | 9/2018 |
| JP | 2019-012049 | 1/2019 |
| JP | 2019-074328 | 5/2019 |
| JP | 2019-513504 | 5/2019 |
| JP | 2019-130243 | 8/2019 |
| JP | 2019-139693 | 8/2019 |
| WO | 2016/052747 | 4/2016 |
| WO | 2017/139761 | 8/2017 |

OTHER PUBLICATIONS

"Report on Project on Founding Needs and Seeds Cooperative Joint Council of Caregiver Robots" (Dated: Mar. 2018).
"Nikkei Health" (Dated: Mar. 2015).
Notice of Submission of Publication for Japanese Patent Application No. 2022-107454 dated Aug. 6, 2024, Sep. 16, 2024.
Huiqin, et al. "Observation on effect of cluster of care for prevention of constipation", Chinese General Practice Nursing, Oct. 2016, vol. 14, No. 29, pp. 3055-3057.
Ohira, et al. "Study on a data management tool for nursing care facilities for the elderly", IPSJ SIG Technical Report, 2019.

* cited by examiner

FIG.6

| USER ID | DATE AND TIME | PROPERTY | ACQUISITION MODE | ... |
|---|---|---|---|---|
| U1 | t1 | NORMAL FECES | DETECTION | ... |
| | t2 | LOOSE FECES | INPUT | ... |
| | t3 | LOOSE FECES | DETECTION | ... |
| | ... | ... | ... | ... |
| U2 | ... | ... | ... | ... |
| U3 | ... | ... | ... | ... |
| ... | ... | ... | ... | ... |

121

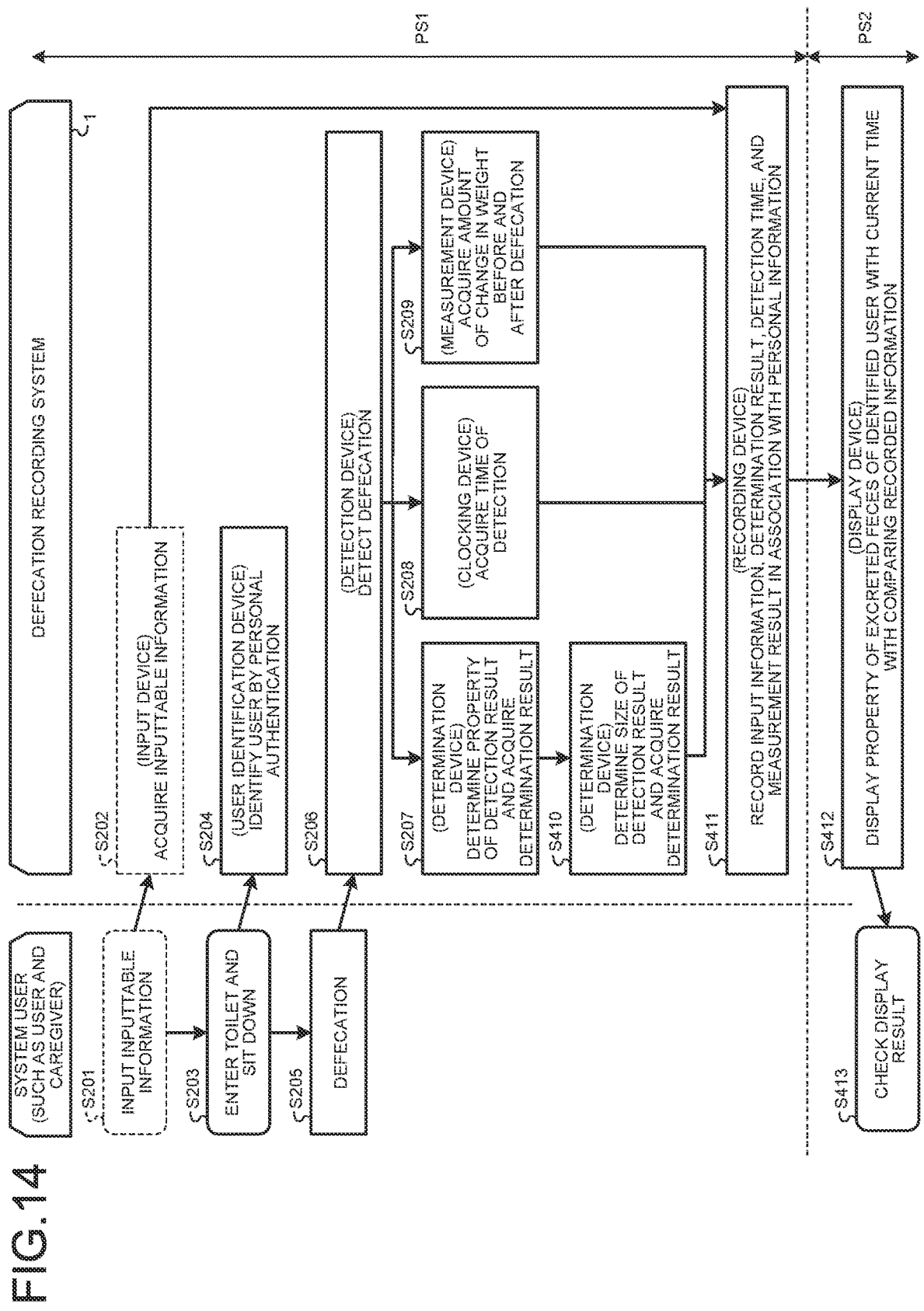

DEFECATION RECORDING SYSTEM, DEFECATION RECORDING METHOD AND DEFECATION RECORDING PROGRAM

FIELD

The disclosed embodiments relate to a defecation recording system, a defecation recording method and a defecation recording program.

BACKGROUND

With the declining birthrate and aging population, the number of elderly people with dementia is expected to increase, and there is concern that the problem of nursing care for elderly people with dementia will become even more serious. In particular, care recipients (patients) with early-stage to mid-stage dementia in care facilities may have fecal incontinence in places other than toilets despite their wide range of activities due to their independence in daily life, which is a cause of increasing the burden of nursing care. For such care recipients, in the current care facilities, the defecation timing of the care recipient is predicted on the basis of the own experience and intuition of a caregiver, and defecation is promoted by regularly guiding the care recipient to a toilet. However, due to a further increase in the burden of nursing care accompanying the increase in the number of care recipients in the future, it is expected that the current response will eventually become unmanageable.

Against this background, there is a need for a technique which can guide a care recipient to a toilet more efficiently than before on the basis of actual measurement information instead of regularly guiding the care recipient to the toilet on the basis of the own experience and intuition of a caregiver. Therefore, for example, a defecation prediction device is known which is capable of predicting a defecation timing on the basis of actual measurement information such as the thickness of a rectum detected by an ultrasonic sensor. (See, for example, Patent Literature 1)

CITATION LIST

Patent Literature

Patent Literature 1: WO 2016/052747 A

SUMMARY

Technical Problem

However, in the above-described defecation prediction device in the related art, it is necessary to attach an ultrasonic sensor to the abdomen of a detection target person such as a care recipient in order to acquire actual measurement information. Further, every time the ultrasonic sensor is attached, for example, when the ultrasonic sensor is removed and then worn again, it is necessary to apply ultrasonic gel or fix the ultrasonic sensor with tape. Furthermore, it is necessary to manage the power source such as a battery. Thus, it is necessary to manage the device on a daily basis. In this way, in the above-described related art, the defecation timing is predicted on the basis of the actual measurement information, and thus the burden of nursing care associated with the introduction of the device increases. Therefore, it is desired to suppress an increase in the burden on a user regarding defecation recording.

An object of the disclosed embodiment is to provide a defecation recording system, a defecation recording method, and a defecation recording program which suppress an increase in a burden on a user regarding defecation recording.

Solution to Problem

A defecation recording system according to an aspect of the embodiment, comprising: a toilet bowl which is installed in a toilet room; a user identification device which identifies a user who uses the toilet bowl; a detection device which detects feces discharged into the toilet bowl; a determination device which determines a property of the feces from a detection result of the detection device; a clocking device which acquires time information indicating date and time of detection of the detection device; a recording device which records the property of the feces and the time information as personal data in association with the user identified by the user identification device; and a display device which displays information regarding the feces based on the personal data recorded in the recording device.

According to the defecation recording system according to one aspect of the embodiment, when the property of feces is determined on the basis of the detection result of the feces discharged into the toilet bowl, the property of feces can be determined without imposing a burden such as visual check on the user of the toilet bowl (also simply referred to as "user"). Further, the property of feces and the date and time of the excretion of the feces (also referred to as "excretion date and time") can be managed in association with each other by using the time information indicating the date and time of the detection of the feces discharged into the toilet bowl, and it is possible to grasp the interval between the previous discharge of feces to this discharge of feces. Then, according to the defecation recording system according to one aspect of the embodiment, when the information of the property of the feces and the excretion date and time thereof collected as described above is recorded as the personal data in association with the user of the toilet bowl, it is possible to record the property of the feces excreted by the user and the excretion date and time in association with the user without requiring the processing for recording of the user. In this way, according to the defecation recording system according to one aspect of the embodiment, it is possible to suppress an increase in the burden regarding the recording of defecation on the user. Therefore, according to the defecation recording system according to one aspect of the embodiment, it is possible to record the fecal property as a health index or physical condition index without burdening the user.

In the defecation recording system according to an aspect of the embodiment, wherein the determination device is capable of automatically determining the property of the feces by dividing the property into at least three types of results corresponding to loose feces, normal feces, and hard feces, and the display device causes a display of the personal data to differ according to a determination result of the property of the feces.

According to the defecation recording system according to one aspect of the embodiment, it is possible to make a determination by dividing actual measurement information regarding the property of feces discharged by the user into at least three types of loose feces (diarrhea feces), normal feces, and hard feces (constipated feces), and further it is possible to cause the display of the display device to differ according to each determination result. Accordingly, it is possible to grasp at a glance which property (hardness) of feces tend to be discharged, and it is possible to realize more efficient guidance to the toilet.

In the defecation recording system according to an aspect of the embodiment, wherein the display device is capable of displaying current time and displays information indicating a possibility that the identified user excretes at the current time.

According to the defecation recording system according to one aspect of the embodiment, it is possible to display information such as a numerical value (probability) indicating a possibility that the user excretes at the current time. Accordingly, it is possible to grasp whether or not to guide to the toilet on the basis of the information predicted from actual measurement information such as the property of the feces determined in the past and the information of the time required to discharge the property of the feces, and it is possible to realize more efficient guidance to the toilet.

In the defecation recording system according to an aspect of the embodiment, wherein the display device displays information indicating the property of the feces which is possible to be excreted by the identified user.

According to the defecation recording system according to one aspect of the embodiment, it is possible to display the property of feces which is likely to be excreted by the user at the current time. Accordingly, it is possible to grasp whether or not to guide to the toilet from actual measurement information such as the property of the feces determined in the past and the information of the time required to discharge the property of the feces, and it is possible to realize more efficient guidance to the toilet.

The defecation recording system according to an aspect of the embodiment further comprising: an input device which is capable of inputting fecal incontinence information regarding fecal incontinence of the user, wherein the recording device records the fecal incontinence information as the personal data in association with the identified user.

According to the defecation recording system according to one aspect of the embodiment, it is possible to record the input information regarding the fecal incontinence of the user in association with the identified user together with other information. Therefore, it is possible to appropriately supplement personal data with the input information regarding fecal incontinence, and it is possible to grasp whether or not the defecation cycle between the previous discharge of feces and the current discharge of feces includes fecal incontinence therein. Accordingly, it is possible to compare a case where feces is continuously discharged in the toilet bowl without causing fecal incontinence and a case where fecal incontinence occurs between the previous discharge of feces and the current discharge of feces, and it is possible to realize more efficient guidance to the toilet.

The defecation recording system according to an aspect of the embodiment further comprising: an input device which is capable of inputting drug information regarding laxatives or antidiarrheals taken by the user, wherein the recording device records the drug information as the personal data in association with the identified user.

According to the defecation recording system according to one aspect of the embodiment, it is possible to record the input information regarding laxatives or antidiarrheals taken by the user in association with the identified user together with other information.

Therefore, it is possible to grasp whether or not the defecation cycle between the previous discharge of feces and the current discharge of feces includes drug-taking therein. Accordingly, with reference to a case where feces is continuously discharged in the toilet bowl without taking drugs, it is possible to determine whether or not a period elapsed until the current discharge of feces is a reasonable period for taking drugs. Therefore, it is possible to minimize the drug-taking which imposes a burden on the body. Further, it is possible to grasp the time required from taking drugs to discharging feces, and thus it is possible to realize more efficient guidance to the toilet.

In the defecation recording system according to an aspect of the embodiment, wherein the determination device determines a size of the feces from the detection result of the detection device, and the recording device records the size of the feces and the time information as the personal data in association with the user identified by the user identification device.

According to the defecation recording system according to one aspect of the embodiment, when the size of feces is determined on the basis of the detection result of the feces discharged into the toilet bowl, the size of feces can be determined without imposing a burden such as visual check on the user. Further, by using the time information indicating the date and time of the detection of the feces discharged into the toilet bowl, it is possible to manage the size of feces and the excretion date and time of the feces in association with each other. Then, according to the defecation recording system according to one aspect of the embodiment, when the information of the size of the feces and the excretion date and time thereof collected as described above is recorded as the personal data in association with the user of the toilet bowl, it is possible to record the size of the feces excreted by the user of the toilet bowl and the excretion date and time in association with the user without requiring the processing for recording of the user. In this way, according to the defecation recording system according to one aspect of the embodiment, it is possible to suppress an increase in the burden regarding the recording of defecation on the user. Therefore, according to the defecation recording system according to one aspect of the embodiment, it is possible to record the size of feces as a health index or physical condition index without burdening the user.

A defecation recording method according to an aspect of the embodiment, comprising: a user identification step of identifying a user who uses a toilet bowl installed in a toilet room; a detection step of detecting feces discharged into the toilet bowl; a determination step of determining a property of the feces from a detection result of the detection step; a clocking step of acquiring time information indicating date and time of detection of the detection step; a recording step of recording the property of the feces and the time information as personal data in association with the user identified by the user identification step; and a display step of displaying information regarding the feces based on the personal data recorded in the recording step.

According to the defecation recording method according to one aspect of the embodiment, when the property of feces is determined on the basis of the detection result of the feces discharged into the toilet bowl, the property of feces can be determined without imposing a burden such as visual check on the user. Further, the property of the feces and the excretion date and time of the feces can be managed in association with each other by using the time information indicating the date and time of the detection of the feces discharged into the toilet bowl, and it is possible to grasp the interval between the previous discharge of feces to this discharge of feces. Then, according to the defecation recording method according to one aspect of the embodiment, when the information of the property of the feces and the excretion date and time thereof collected as described above is recorded as the personal data in association with the user of the toilet bowl, it is possible to record the property of the feces excreted by the user of the toilet bowl and the excretion date and time in association with the user without requiring the processing for recording of the user. In this way, according to the defecation recording method according to one aspect of the embodiment, it is possible to suppress an increase in the burden regarding the recording of defecation on the user. Therefore, according to the defecation recording method according to one aspect of the embodiment, it is possible to record the fecal property as a health index or physical condition index without burdening the user.

A defecation recording program stored by a computer-readable recording medium according to an aspect of the embodiment, for causing a computer to execute: a determination procedure of determining a property of feces from a detection result obtained when the feces discharged into a toilet bowl installed in a toilet room is detected by a detection device; a clocking procedure of acquiring time information indicating date and time of detection of the detection device; and a recording procedure of recording the property of the feces and the time information as personal data in association with a user identified by a user identification device which identifies the user who uses the toilet bowl.

According to the defecation recording program stored by the computer-readable recording medium according to one aspect of the embodiment, when the property of feces is determined on the basis of the detection result of the feces discharged into the toilet bowl, the property of feces can be determined without imposing a burden such as visual check on the user. Further, the property of the feces and the excretion date and time of the feces can be managed in association with each other by using the time information indicating the date and time of the detection of the feces discharged into the toilet bowl, and it is possible to grasp the interval between the previous discharge of feces to this discharge of feces. Then, according to the defecation recording program according to one aspect of the embodiment, when the information of the property of the feces and the excretion date and time thereof collected as described above is recorded as the personal data in association with the user of the toilet bowl, it is possible to record the property of the feces excreted by the user of the toilet bowl and the excretion date and time in association with the user without requiring the processing for recording of the user. In this way, according to the defecation recording program according to one aspect of the embodiment, it is possible to suppress an increase in the burden regarding the recording of defecation on the user. Therefore, according to the defecation recording program according to one aspect of the embodiment, it is possible to record the fecal property as a health index or physical condition index without burdening the user.

Advantageous Effects of Invention

According to one aspect of the embodiment, it is possible to suppress an increase in the burden on the user regarding the defecation recording.

BRIEF DESCRIPTION OF DRAWINGS

FIG. 6 is a diagram illustrating an example of a history information DB according to the embodiment.

FIG. 14 is a diagram illustrating an example of information processing in the defecation recording system according to the modification.

DESCRIPTION OF EMBODIMENTS

Hereinafter, an embodiment of a defecation recording system disclosed in the present application will be described in detail with reference to the accompanying drawings. Incidentally, the present invention is not limited to the embodiment described below.

<1. Information Processing of Defecation Recording System>

First, the contents of information processing executed in the defecation recording system according to the embodiment will be described with reference to FIG. 1.

Figure 1:
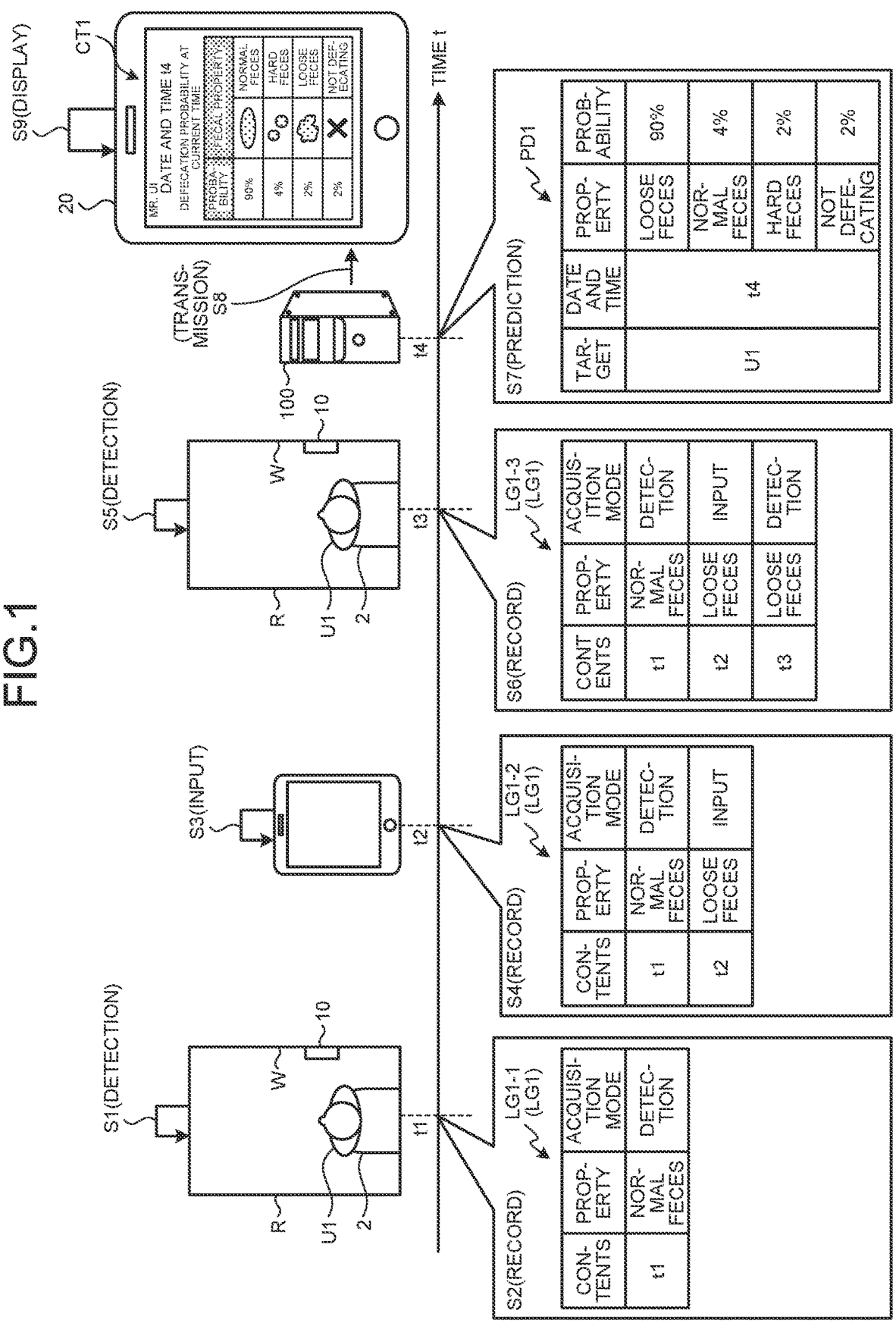
FIG. 1 is a diagram illustrating an example of information processing according to an embodiment.

FIG. 1 is a diagram illustrating an example of the information processing according to the embodiment. In the example illustrated in FIG. 1, a case is described in which information processing is performed by a defecation recording system 1 with a user U1 as a target person in a predetermined facility such as a care facility. For example, the user U1 is a care recipient (patient) who moves into the care facility and is a person who receives nursing care by a caregiver or the like who works at the care facility. A toilet room R illustrated in FIG. 1 is provided in the care facility, and indicates a space in which a toilet seat device 2 is arranged therein, and an operation device 10 is arranged on a wall surface W. Incidentally, in FIG. 1, logs LG1-1 to LG1-3 are described according to the update (addition) of recorded history information, but it is simply referred to as "log LG1" unless the description is given separately. For example, the log LG1 is stored in a history information DB 121 (see FIG. 5) as personal data of the user U1 in association with information (ID and the like) which identifies the user U1. Further, in the example of FIG. 1, a case is described in which a communication terminal 20 is a tablet type terminal used by the caregiver or the like.

First, in the example of FIG. 1, at date and time t1, the user U1 sits on the toilet seat device 2 of the toilet room R and defecates. Accordingly, the defecation recording system 1 detects information regarding the defecation of the user U1 at the date and time t1 (Step S1). The defecation recording system 1 detects the information regarding the defecation of the user U1 at the date and time t1 by the toilet seat device 2.

Then, the defecation recording system 1 stores the detected information regarding the defecation of the user U1 (Step S2). The defecation recording system 1 stores the detected information regarding the defecation of the user U1 and the information for identifying the user U1 in association with each other. The defecation recording system 1 stores the detected information regarding the defecation of the user U1 and the information for identifying the user U1 in association with each other in a storage unit 120 (see FIG. 5) of an information processing device 100. In the example of FIG. 1, the defecation recording system 1 stores information indicating that fecal property at the date and time t1 is "normal feces" as indicated in the log LG1-1. Further, the defecation recording system 1 stores information indicating that the information regarding the defecation at the date and time t1 is acquired by the detection as indicated in the log LG1-1.

Then, in the example of FIG. 1, at date and time t2, the user U1 cannot appropriately use the toilet room R, and fecal incontinence happens. Therefore, the caregiver who nurses the user U1 inputs information (input information) indicating that fecal incontinence happens to the user U1 at the date and time t2 to the communication terminal 20 (Step S3). For example, the caregiver who nurses the user U1 inputs the date and time t2 when fecal incontinence happens to the user U1 and information indicating the fecal property thereof in the communication terminal 20. Then, the communication terminal 20 transmits the input information to the information processing device 100.

Then, the defecation recording system 1 stores the input information regarding the defecation of the user U1 (Step S4). The defecation recording system 1 stores the information (input information), which is input in the communication terminal 20, regarding the defecation of the user U1 and the information for identifying the user U1 in association with each other. In the example of FIG. 1, the defecation recording system 1 stores information indicating that fecal property at the date and time t2 is "loose feces" as indicated in the log LG1-2. Further, the defecation recording system 1 stores information indicating that the information regarding the defecation at the date and time t2 is acquired by the input as indicated in the log LG1-2. Incidentally, in a case where fecal incontinence does not happen to the user U1, the defecation recording system 1 may use only the information of the user U1 collected by the detection without using the input information.

Then, in the example of FIG. 1, at date and time t3, the user U1 sits on the toilet seat device 2 of the toilet room R and defecates. Accordingly, the defecation recording system 1 detects information regarding the defecation of the user U1 at the date and time t3 (Step S5). The defecation recording system 1 detects the information regarding the defecation of the user U1 at date and time t3 by the toilet seat device 2.

Then, the defecation recording system 1 stores the detected information regarding the defecation of the user U1 (Step S6). In the example of FIG. 1, the defecation recording system 1 stores information indicating that fecal property at the date and time t3 is "loose feces" as indicated in the log LG1-3. Further, the defecation recording system 1 stores information indicating that the information regarding the defecation at the date and time t3 is acquired by the detection as indicated in the log LG1-3.

Then, the defecation recording system 1 predicts the defecation of the user U1 at date and time t4 (Step S7). For example, the defecation recording system 1 predicts the defecation of the user U1 in response to a request from the caregiver who nurses the user U1. The caregiver who nurses the user U1 may request the information processing device 100 to predict the defecation of the user U1 by operating the communication terminal 20. The defecation recording system 1 predicts the defecation of the user U1 at the date and time t4 by the information processing device 100.

In the example of FIG. 1, the defecation recording system 1 generates prediction information regarding the presence/absence and property of the defecation of the user U1 at the date and time t4 as indicated in the prediction information PD1. The defecation recording system 1 predicts the probabilities at the date and time t4 for respective properties of the feces of the user U1. For example, since loose feces is recorded continuously for the user U1, the defecation recording system 1 predicts that the possibility that the feces of the user U1 is loose feces is high. In the defecation recording system 1, it is predicted that the probability that the feces of the user U1 is loose feces is "90%", the probability that the feces is normal feces is "4%", the probability that the feces is hard feces is "2%", and the probability of not defecating is "2%".

Then, the defecation recording system 1 transmits the predicted information to a display device for displaying information (Step S8). For example, the defecation recording system 1 transmits the information predicted by the information processing device 100 to the communication terminal 20 which is a display device for displaying information. The information processing device 100 transmits, to the communication terminal 20, contents CT1 indicating that the probability that the feces of the user U1 is loose feces is "90%", the probability that the feces is normal feces is "4%", the probability that the feces is hard feces is "2%", and the probability of not defecating is "2%".

Then, the defecation recording system 1 displays the information on the display device (Step S9). Specifically, the defecation recording system 1 displays the information on a (mobile) device such as the smartphone of the caregiver. For example, the defecation recording system 1 preferably displays the information on the display device outside the toilet space such as the toilet room R. Incidentally, the above description is an example, and the defecation recording system 1 may display information on any display device. In the example of FIG. 1, the defecation recording system 1 displays the information on the communication terminal 20 which is a display device for displaying information. The communication terminal 20 display the contents CT1 indicating that the probability that the feces of the user U1 is loose feces is "90%", the probability that the feces is normal feces is "4%", the probability that the feces is hard feces is "2%", and the probability of not defecating is "2%".

As described above, the defecation recording system 1 collects information regarding the defecation of the user U1 and predicts the probability of defecation of the user U1 at the prediction time point. In this way, when the prediction regarding the defecation of each user is performed on the basis of the defecation tendency of each user, the defecation recording system 1 can improve the prediction accuracy according to the defecation tendency of each user. Therefore, the defecation recording system 1 can appropriately perform the prediction regarding the defecation of the user according to the tendency of each user.

Further, the defecation recording system 1 displays the predicted probability of defecation of the user U1 on the communication terminal 20 used by the caregiver or the like who nurses the user U1. In this way, when the history and prediction of excretion is displayed to visualize the excretion, the defecation recording system 1 can reduce the failure of excretion such as not being able to excrete at an appropriate place and provide an environment for performing the excretion appropriately.

As described above, when the information indicating the possibility of defecation is displayed on the communication terminal 20, the defecation recording system 1 can cause the caregiver or the like who nurses the user U1 to appropriately recognize the possibility of the defecation of the user U1. For example, the caregiver or the like who recognizes the possibility of the defecation of the user U1 can guide the user U1 to the toilet according to the possibility. Further, in the defecation recording system 1, in a case where the user U1 appropriately defecates in the toilet room R, the information regarding the defecation of the user U1 is automatically collected, and thus the caregiver or the like who nurses the user U1 can save time and effort to manually input the information. Therefore, the defecation recording system 1 can efficiently guide the target person to the toilet and suppress an increase in the burden of nursing care related to defecation.

Incidentally, the various types of information processing illustrated in FIG. 1 are not limited to the above, and may be in various modes. This point will be described below.

<1-1. Display of Information>

In the above example, a case where a display is performed on the basis of the request from the caregiver is described as an example. However, the display of information is not limited to the mode of performing a display on the basis of the request from the caregiver, and may be in various modes. The defecation recording system 1 may display information at a predetermined timing regardless of the request from the caregiver. For example, the defecation recording system 1 may perform a display on the terminal (such as the communication terminal 20 and the smartphone 502 of the caregiver) owned by the caregiver at an appropriate current time on the basis of the prediction of the defecation recording system 1. For example, the defecation recording system 1 may perform a display on the terminal owned by the caregiver at a predetermined time (for example, 10:00 or 15:00). Incidentally, the above description is an example, and the defecation recording system 1 may display information at various timings.

For example, the defecation recording system 1 may notify an alert at a predetermined timing. In this case, the defecation recording system 1 may display an alert that "excretion is likely to occur soon" on the terminal (such as the communication terminal 20 and the smartphone of the caregiver) of the caregiver. For example, in a case where defecation is predicted regularly (for example, at intervals of 10 minutes or 30 minutes), and a prediction result meets a predetermined condition, the defecation recording system 1 may display an alert that "excretion is likely to occur soon" on the terminal of the caregiver. In this case, in a case where the probability of "not defecating" in the prediction result of the defecation prediction becomes less than a predetermined threshold value (for example, 50%), the defecation recording system 1 may display an alert that "excretion is likely to occur soon" on the terminal of the caregiver. Further, in a case where the probability that defecation is predicted to occur becomes more than a predetermined threshold value (for example, 70%), the defecation recording system 1 may display an alert that "excretion is likely to occur soon" on the terminal of the caregiver. Incidentally, the above description is an example, and the defecation recording system 1 may determine the timing of notification by using various conditions.

<1-2. Information to be Displayed>

In the example of FIG. 1, an example of displaying the predicted information is described. However, the defecation recording system 1 may display the personal data of a designated user. The defecation recording system 1 may display the personal data of the user designated by the communication terminal 20 on the communication terminal 20. In a case where the caregiver or the like operates the communication terminal 20 to designate a user, the defecation recording system 1 may display the personal data of the designated user on the communication terminal 20. For example, the defecation recording system 1 may display the history information of the designated user on the communication terminal 20. The defecation recording system 1 may display a list of the past defecation property and the date and time of the designated user on the communication terminal 20.

For example, the caregiver or the like of the user operates the communication terminal 20 to request the history information of the user. The communication terminal 20 transmits the request information including the information for identifying the user and the information indicating that the history information of the user is requested to the information processing device 100. The information processing device 100 which receives the request information extracts the history information of the user indicated by the request information from the history information DB 121. For example, the information processing device 100 extracts the history information indicating the date and time and property of the past defecation of the designated user from the history information DB 121. Then, the information processing device 100 transmits the extracted user history information to the communication terminal 20. The communication terminal 20 which receives the history information of the user displays the history information of the user.

<1-3. Prediction>

The defecation recording system 1 may use any information to perform a prediction as long as it is possible to perform the prediction regarding the defecation of the user at the current time. For example, the defecation recording system 1 may perform a prediction on the basis of a criterion regarding the property of excretion. On the basis of the criterion that the harder feces require more time, the defecation recording system 1 may predict that the defecation interval becomes longer in a case where the property is hard feces. Further, on the basis of the criterion that the looser feces require less time, the defecation recording system 1 may predict that the defecation interval becomes shorter in a case where the property is loose feces. The defecation recording system 1 may predict that as time elapses from the latest defecation, the possibility of loose feces decreases, and the possibility of hard feces increases. In this way, the defecation recording system 1 may make a prediction on the basis of the type (property and the like) of excretion and the time (interval) of excretion.

Further, for example, the defecation recording system 1 makes a prediction on the basis of the information of the user. In a case where the defecation interval (cycle) of the user is every half day (12 hours), the defecation recording system 1 may predict that the possibility of defecation gradually increases within 12 hours from the latest defecation and becomes 100% at the time when 12 hours elapse. For example, in a case where the user has a history of returning to normal feces after several loose feces, for the user, the defecation recording system 1 may predict that when the loose feces continues, the probability of loose feces decreases, and the probability of normal feces increases.

The defecation recording system 1 may use the history of the past defecation of the user to perform the prediction regarding the defecation of the user at the current time. The defecation recording system 1 may perform the prediction regarding the defecation of the user at the current time on the basis of the tendency of the past defecation of the user. For example, the defecation recording system 1 may perform the prediction regarding the defecation of the user at the current time on the basis of the interval of the past defecation of the user and the property of each defecation. For example, in a case where the user continuously excretes loose feces in the most recent (previous two times or the like) defecation, the defecation recording system 1 may predict that the possibility that the feces of the user at the current time is loose feces is high.

For example, in a case where the user has a history indicating that hard feces is excreted when the interval of the defecation of the user is longer than a predetermined period (for example, three days), the defecation recording system 1 may predict that the possibility that the feces of the user is hard feces is high in a case where a predetermined period elapses from the immediately preceding defecation. For example, in a case where the user has a history indicating that normal feces is excreted when the user defecates in a regular cycle, the defecation recording system 1 may predict that the possibility that the feces of the user is hard feces is high in a case where a prediction time point is when the regular cycle passes from the immediately preceding defecation.

Further, the defecation recording system 1 may perform a prediction by using a technique related to machine learning. For example, the defecation recording system 1 may generate a model using the history information of the user as learning data and make a prediction by using the generated model. For example, the defecation recording system 1 may generate a model using the property of the past defecation of the user and the interval (time difference) between the defecation and the immediately preceding defecation as learning data. The defecation recording system 1 may generate a model for predicting the property of defecation at a prediction time point by inputting the interval (time difference) between one defecation and the immediately preceding defecation and the property of the past defecation. In this case, in the defecation recording system 1, the model may be caused to output information that predicts the property of the defecation at the prediction time point when the interval (time difference) between the time at that time point (prediction time point) and the latest defecation time and the property of the past defecation are input into the model. Then, the defecation recording system 1 may use the information output by the model as the prediction information or may make a prediction on the basis of the information output by the model.

<2. External Configuration of Toilet Room>

Figure 2:
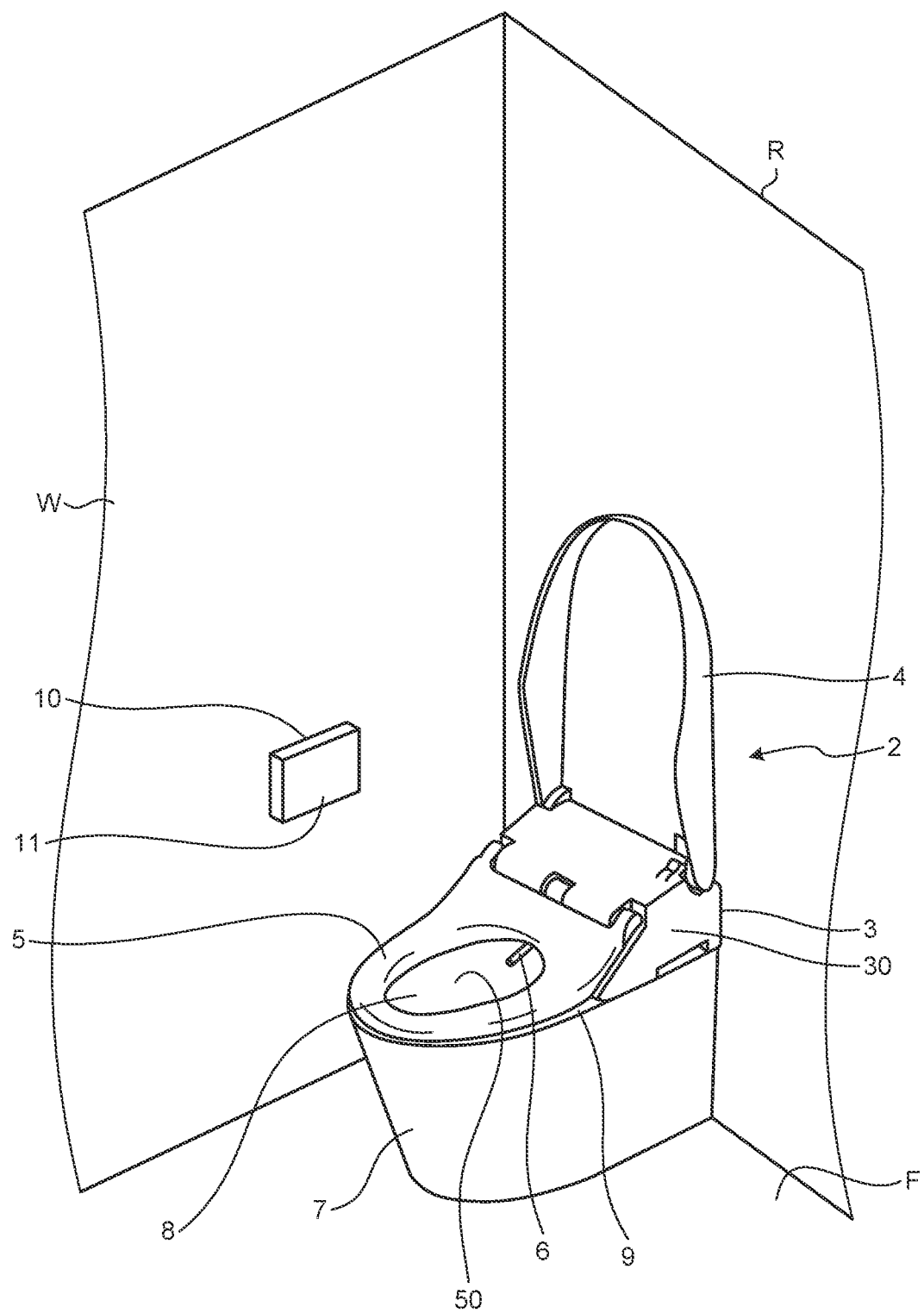
FIG. 2 is a schematic perspective view illustrating an example of an external configuration of a toilet room according to the embodiment.

Next, the external configuration of the toilet room according to the embodiment will be described with reference to FIG. 2. FIG. 2 is a schematic perspective view illustrating an example of the external configuration of the toilet room according to the embodiment.

As illustrated in FIG. 2, the defecation recording system 1 includes the toilet seat device 2 and the operation device 10. As illustrated in FIG. 2, in the toilet room R, a Western-style toilet bowl (hereinafter referred to as "toilet bowl") 7 is installed on a floor surface F. Incidentally, in the following, a direction of facing the space of the toilet room R from the floor surface F is described as upward. The toilet seat device 2 is provided on the upper part of the toilet bowl 7.

The toilet bowl 7 is made of pottery, for example. A bowl portion 8 is formed on the toilet bowl 7. The bowl portion 8 has a downwardly recessed shape and is a portion which receives excrement from the user. Incidentally, the toilet bowl 7 is not limited to the floor-standing type as described in the drawing, and may be of any type as long as the defecation recording system 1 can be applied, or may be of a wall-hanging type or the like. The toilet bowl 7 is provided with a rim portion 9 over the entire circumference of the end of the opening facing the bowl portion 8. In the toilet room R, for example, a cleaning water tank for storing cleaning water may be installed near the toilet bowl 7, or the toilet bowl 7 may be a so-called tankless type in which a cleaning water tank is not installed.

For example, when the cleaning operation unit (not illustrated) for cleaning provided in the toilet room R is operated by the user, the toilet bowl cleaning is performed by supplying cleaning water to the bowl portion 8 of the toilet bowl 7. The cleaning operation unit may be an operation lever or a touch operation on a toilet bowl cleaning object displayed on the operation device 10. Incidentally, the cleaning operation unit is not limited to the operation lever or the like which manually performs toilet bowl cleaning by the user, and the cleaning operation unit may perform the toilet bowl cleaning by human body detection of a sensor, such as a seating sensor, for detecting the user.

The toilet seat device 2 is attached to the upper part of the toilet bowl 7, and includes a main body portion 3, a toilet lid 4, a seating portion 5, and a nozzle portion 6. Incidentally, the toilet seat device 2 may be detachably attached to the toilet bowl 7 or may be attached to be integrated with the toilet bowl 7.

As illustrated in FIG. 2, the seating portion 5 is a so-called toilet seat, is formed in an annular shape having an opening in the center, and is arranged along the rim portion 9 at a position overlapping the opening of the toilet bowl 7. Then, the seating portion 5 supports the buttocks of the seated user. Further, as illustrated in FIG. 2, one end of each of the toilet lid 4 and the seating portion 5 is pivotally supported by the main body portion 3, and is rotatably (openable and closable) attached around the shaft support portion of the main body portion 3. Incidentally, the toilet lid 4 may be attached to the toilet seat device 2 as needed, and the toilet seat device 2 may not have the toilet lid 4.

The nozzle portion 6 is a nozzle for cleaning a private portion. The nozzle portion 6 is configured to be able to advance or retreat with respect to the housing of the main body portion 3 by the driving of a drive source such as an electric motor (not illustrated). Further, the nozzle portion 6 is connected to a water source such as a water pipe (not illustrated). Then, as illustrated in FIG. 2, when the nozzle portion 6 is in a position advanced with respect to the housing of the main body portion 3, water from the water source is ejected to the body of the user to clean a private portion.

The operation device 10 is provided in the toilet room R. The operation device 10 is provided at a position which allows the user to perform operation. The operation device 10 is provided at a position which allows the user to perform operation when sitting on the seating portion 5. In the example illustrated in FIG. 2, the operation device 10 is arranged on the wall surface W on the right side when viewed from the user sitting on the seating portion 5. Incidentally, the operation device 10 is not limited to the wall surface and may be arranged in various modes as long as the operation device 10 can be used by the user sitting on the seating portion 5. For example, the operation device 10 may be provided integrally with the toilet seat device 2.

The operation device 10 is communicably connected to the toilet seat device 2 via a predetermined network (for example, a network N in FIG. 5) by wire or wirelessly. For example, the toilet seat device 2 and the operation device 10 may be connected in any way as long as information can be transmitted and received, and may be connected to be communicable by wire or may be connected to be communicable wirelessly.

The operation device 10 receives various operations from the user through a display surface (for example, a display screen 11) by a touch panel function, for example. Further, the operation device 10 may be provided with switches and buttons and receive various operations by the switches and buttons. The display screen 11 is a display screen of a tablet terminal or the like realized by, for example, a liquid crystal display or an organic electro-luminescence (EL) display, and is a display device for displaying various kinds of information. That is, through the display screen 11, the operation device 10 receives the input of the user and also performs output to the user. The display screen 11 displays various kinds of information.

The operation device 10 receives the operation of the user for stopping the control being executed by the toilet seat device 2. The operation device 10 receives the operation of the user for starting the execution of private-portion cleaning by the toilet seat device 2. The operation device 10 receives an instruction from the user to the nozzle portion 6.

For example, the operation device 10 may display an object which receives the above-described user operation on the display screen 11 and execute various processes in response to the contact of the user with the displayed object. For example, the operation device 10 may have switches, buttons, and the like which receive the above-described user operation, and may execute various processes in response to the contact of the user with the switches, buttons, and the like. Incidentally, the above is an example, and the operation device 10 may receive the operation of the user who executes various processes.

Further, the defecation recording system 1 may identify the user by the operation of the user with respect to the operation device 10. The operation device 10 may function as an authentication device which identifies the user. For example, the operation device 10 identifies the user by personal authentication. The operation device 10 may identify the user on the basis of the biometric information of the user. The operation device 10 may identify the user on the basis of the biometric information, such as fingerprint and veins, of the user and the like. In this case, the defecation recording system 1 may include the operation device 10 which functions as a user identification device. Incidentally, the toilet room R may not have an operation device 10 as long as a configuration (the toilet bowl 7, the toilet seat device 2, or the like) for the user to defecate is arranged.

<3. Configuration of Defecation Recording System>

Herein, the configuration of the defecation recording system will be described with reference to FIGS. 3 to 5.

First, the configuration of the defecation recording system 1 will be described with reference to FIG. 3. FIG. 3 is a conceptual diagram illustrating an example of the configuration of the defecation recording system according to the embodiment.

Figure 3:
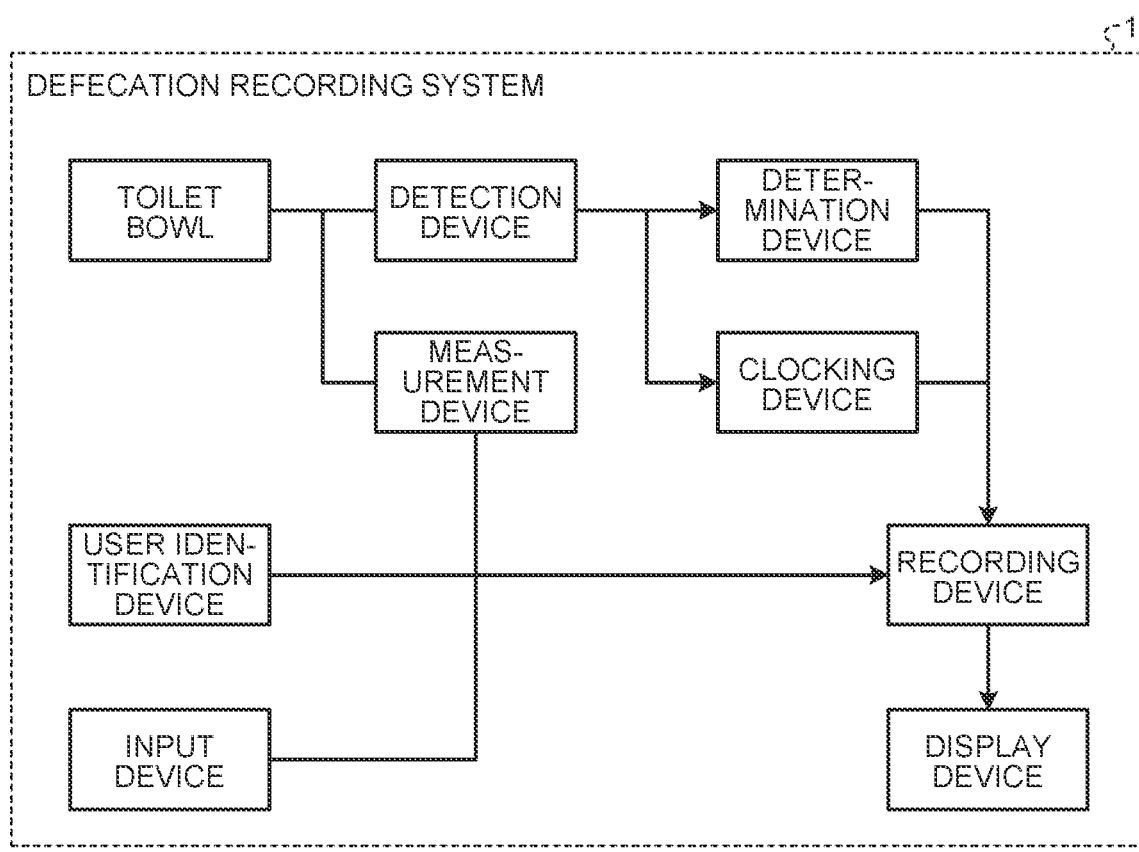
FIG. 3 is a conceptual diagram illustrating an example of a configuration of a defecation recording system according to the embodiment.

As illustrated in FIG. 3, the defecation recording system 1 includes a toilet bowl, a detection device, a measurement device, a user identification device, a determination device, a clocking device, a recording device, a display device, and an input device. Incidentally, FIG. 3 illustrates a configuration in which the devices are divided according to the functions of the defecation recording system 1. However, the defecation recording system 1 may be configured by devices which realize a plurality of functions, and details on the point will be described later.

The toilet bowl corresponds to the toilet bowl 7 in FIG. 2 and is used for defecation of the user. The detection device realizes a function of detecting the feces discharged into the toilet bowl. The measurement device realizes a function of performing measurement with respect to the user. The user identification device realizes a function of identifying the user who uses the toilet bowl. The determination device realizes a function of determining the property of feces from the detection result. The clocking device realizes a function of acquiring time information indicating the date and time of the detection of feces. The recording device realizes a function of recording the property of feces and the time information as personal data in association with the user identified by the user identification device.

The display device realizes a function of displaying the information regarding feces based on the personal data recorded in the recording device. The input device realizes a function of inputting fecal incontinence information regarding fecal incontinence of the user. The input device realizes a function of inputting drug information regarding laxatives or antidiarrheals taken by the user.

Further, the input device realizes a function of inputting meal information regarding the presence or absence of meals and the meal time of the user. In this case, the recording device records the meal information as the personal data in association with the identified user. In this way, the defecation recording system 1 can record the actual measurement information regarding the presence or absence of meals and the meal time of the user in association with the identified user together with other actual measurement information. Therefore, it is possible to grasp whether or not the defecation cycle between the previous discharge of feces and the current discharge of feces includes a meal therein. Accordingly, it is possible to compare the defecation cycle of a case where feces is discharged into the toilet bowl with a meal therebetween and the defecation cycle of a case where feces is discharged into the toilet bowl with no meals therebetween, and thus it is possible to realize more efficient guidance to the toilet.

Further, the measurement device may measure the weight of the user. For example, the measurement device automatically measures the mass of the feces discharged into the toilet bowl or the amount of change in the weight of the user due to the discharge of the feces into the toilet bowl. In this case, the recording device records the estimation result by the measurement device as the personal data in association with the identified user. In this way, the defecation recording system 1 can record the actual measurement information regarding the mass of the feces discharged into the toilet bowl by the user or the amount of change in the weight of the user due to the discharge of the feces into the toilet bowl in association with the identified user together with other actual measurement information. Accordingly, it is possible to grasp whether the amount of the previous discharge of feces is large or small by referring to the past cases similar to the defecation cycle required until the previous discharge of feces. Then, more efficient guidance to the toilet can be realized by predicting the defecation cycle required until the discharge of the next feces according to the comparison result.

As described above, the defecation recording system 1 may be configured by devices which realize a plurality of functions. This point will be described with reference to FIG. 4. FIG. 4 is another conceptual diagram illustrating an example of the configuration of the defecation recording system according to the embodiment.

Figure 4:
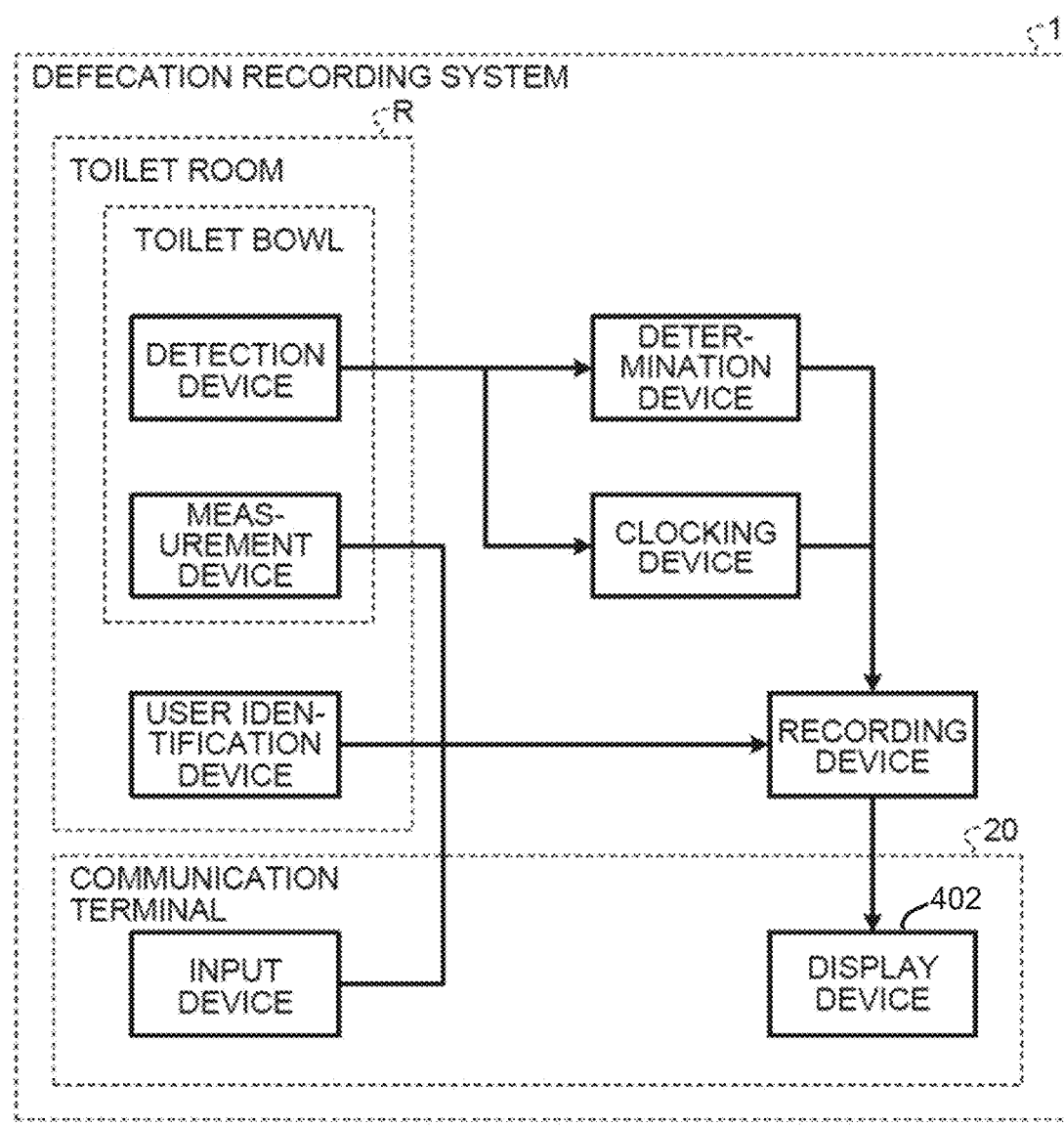
FIG. 4 is another conceptual diagram illustrating an example of the configuration of the defecation recording system according to the embodiment.

In the defecation recording system 1 of FIG. 4, the display device and the input device are realized by one communication terminal 20. In this way, a plurality of functions may be realized by one device. Further, in the defecation recording system 1 of FIG. 4, the toilet bowl, the detection device, the measurement device, and the user identification device are arranged in the toilet room R. In the defecation recording system 1 of FIG. 4, the determination device, the clocking device, and the recording device may be arranged outside the toilet room R, and the communication terminal 20 may be carried by the caregiver or the like or arranged in a space (a working room, an office, or the like) where the caregiver or the like stays.

<3-1. Configuration Example of Defecation Recording System>

Next, the configuration example of the defecation recording system 1 will be described with reference to FIG. 5. FIG. 5 is a block diagram illustrating an example of the configuration of the defecation recording system according to the embodiment. Specifically, FIG. 5 illustrates the configuration of the defecation recording system 1 and the functional configuration of the information processing device 100 included in the defecation recording system 1. The defecation recording system 1 includes the toilet seat device 2, the information processing device 100, and the communication terminal 20.

The toilet seat device 2, the information processing device 100, and the communication terminal 20 are connected to be communicable via a predetermined network N by wire or wirelessly. The toilet seat device 2, the information processing device 100, and the communication terminal 20 may be connected in any way as long as information can be transmitted and received, and may be connected to be communicable by wire or may be connected to be communicable wirelessly. Incidentally, the defecation recording system 1 may include a plurality of toilet seat devices 2, a plurality of information processing devices 100, and a plurality of communication terminals 20.

The toilet seat device 2 is arranged in the toilet room R as illustrated in FIG. 2. In the example of FIG. 5, in the defecation recording system 1, the toilet seat device 2 has a function of identifying the user, a function of detecting information regarding the defecation of the user, a function of detecting information such as the weight of the user, and the like. In this way, the toilet seat device 2 functions as the user identification device, the detection device, and the measurement device, and details on this point will be described later. The toilet seat device 2 detects information regarding the defecation of the user and transmits the information to the information processing device 100.

The information processing device 100 is an information processing device (computer) used for information processing in the defecation recording system 1. The information processing device 100 is a device which realizes a function of making a determination about defecation, a function of clocking, or a function of recording. The information processing device 100 functions as the determination device, the clocking device, and the recording device. The information processing device 100 is arranged outside the toilet room R. The information processing device 100 may be various server devices such as a cloud server. Incidentally, the information processing device 100 may be integrated with the communication terminal 20 in a case where the device has an input function and a display function. In this way, the information processing device 100 may function as the determination device, the clocking device, the recording device, the input device, and the display device.

The communication terminal 20 is an information processing device used by the caregiver or the like who nurses the user (target person). The communication terminal 20 is realized by, for example, a smartphone, a mobile phone, a tablet terminal, a personal digital assistant (PDA), a desktop personal computer (PC), a notebook PC, or the like. The communication terminal 20 may be carried by the caregiver or the like, or may be arranged at a predetermined position outside the toilet room R.

In the defecation recording system 1, the communication terminal 20 functions as the display device for displaying information. Further, in the defecation recording system 1, the communication terminal 20 functions as the input device for inputting information regarding undetected defecation, meals, medications, and the like. In the defecation recording system 1, the communication terminal 20 functions as the input device for inputting information regarding undetected defecation, meals, medications, and the like.

Hereinafter, the configuration of the information processing device 100 will be described. As illustrated in FIG. 5, the information processing device 100 includes a communication unit 110, the storage unit 120, and a control unit 130.

The communication unit 110 is realized by, for example, a communication circuit or the like. Then, the communication unit 110 is connected to a predetermined communication network (network N) (not illustrated) by wire or wirelessly, and transmits/receives information to/from an external information processing device. For example, the communication unit 110 is connected to the network N by wire or wirelessly, and transmits/receives information to/from the toilet seat device 2 and the communication terminal 20.

The storage unit 120 is realized by a semiconductor memory element such as a random access memory (RAM) and a flash memory or a storage device such as a hard disk or an optical disk. As illustrated in FIG. 5, the storage unit 120 according to the embodiment has the history information DB 121. Incidentally, the storage unit 120 is not limited to the history information DB 121, and may store various types of information. The storage unit 120 functions as the recording device which records the property of feces and the time information as personal data in association with the user.

For example, the storage unit 120 may store the information (fecal incontinence information) regarding fecal incontinence of the user and the information (drug information) regarding laxatives or antidiarrheals taken by the user. Further, the storage unit 120 stores the information (meal information) regarding the presence or absence of meals and the meal time of the user. The storage unit 120 records the fecal incontinence information, the drug information, and the meal information as personal data in association with the user.

The history information DB according to the embodiment stores various kinds of history information regarding the user (target person). For example, the history information DB stores various kinds of history information, which is related to the user, of defecation or the like. FIG. 6 is a diagram illustrating an example of the history information DB according to the embodiment. The history information DB stores the history information for each user as personal data. For example, the history information DB stores the history of defecation for each user. The history information DB illustrated in FIG. 6 includes items such as "user ID", "date and time", "property", and "acquisition mode".

The "user ID" indicates the identification information for identifying each user (target person). The "date and time" indicates the date and time when the corresponding information is acquired. Incidentally, in the example of FIG. 6, the information stored in the "date and time" is illustrated by a code such as "t1", but the specific date and time such as "Aug. 22, 2019 15:16:43" is stored in the "date and time".

The "property" indicates the fecal property of the user at the corresponding date and time. The "acquisition mode" indicates a mode of how to acquire the property of the corresponding feces. The "acquisition mode" indicates an acquisition mode such as whether the corresponding fecal property is acquired by detection in the toilet room R or by input.

For example, the example of FIG. 6 shows that the defecation properties at the date and time "t1", the date and time "t2", and the date and time "t3" are acquired from the target person (user U1) identified by the user ID "U1".

It is shown that the fecal property of the user U1 at the date and time "t1" is normal feces. Further, it is shown that the information on the fecal property of the user U1 at the date and time "t1" is acquired by detection. That is, it is shown that the defecation history of the user U1 at the date and time "t1" is acquired by detection in the toilet room R.

Further, it is shown that the fecal property of the user U1 at the date and time "t2" is loose feces. Further, it is shown that the information on the fecal property of the user U1 at the date and time "t2" is acquired by input. That is, it is shown that the defecation history of the user U1 at the date and time "t2" is acquired when the caregiver of the user U1 inputs the defecation information of the user U1 through the communication terminal 20 or the like.

Incidentally, the history information DB is not limited to the above, and various kinds of information may be stored depending on the purpose. The history information DB may store various kinds of information related to each user in association with the date and time. The history information DB 121 may store the fecal incontinence information and the drug information. Further, the history information DB may store the information for identifying the caregiver who performs nursing care in association with each user.

The control unit 130 is realized when a program stored in the storage unit 120 is executed with a RAM as a work area by a central processing unit (CPU), a micro processing unit (MPU), or the like. For example, these various programs include programs of applications (for example, an application for operating toilet equipment) which perform various information processing such as a display process and a determination process. Further, the control unit 130 is realized by, for example, an integrated circuit such as an application specific integrated circuit (ASIC) or a field programmable gate array (FPGA).

Figure 5:
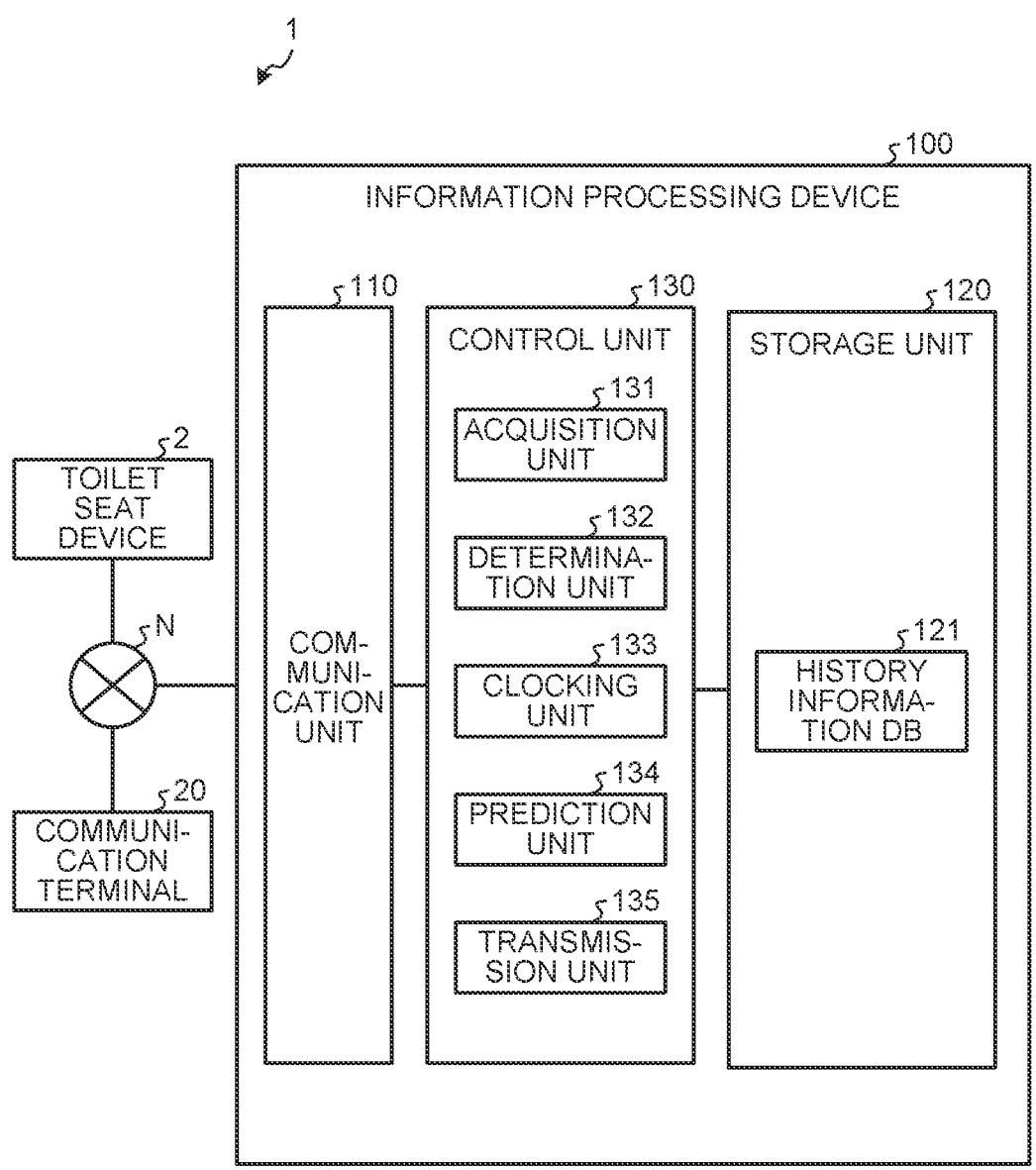
FIG. 5 is a block diagram illustrating an example of the configuration of the defecation recording system according to the embodiment.

As illustrated in FIG. 5, the control unit 130 includes an acquisition unit 131, a determination unit 132, a clocking unit 133, a prediction unit 134, and a transmission unit 135, and realizes or executes the function or the operation of a determination process to be described below. Incidentally, the internal configuration of the control unit 130 is not limited to the configuration illustrated in FIG. 5, and may be another configuration as long as the control unit 130 performs the determination process to be described later. Further, the connection relationship of each processing unit included in the control unit 130 is not limited to the connection relationship illustrated in FIG. 5, and may be another connection relationship.

The acquisition unit 131 acquires various kinds of information. The acquisition unit 131 acquires various kinds of information from the storage unit 120. The acquisition unit 131 acquires various kinds of information from an external information processing device. For example, the acquisition unit 131 acquires various kinds of information from the toilet seat device 2 or the communication terminal 20.

The acquisition unit 131 acquires various kinds of information from the toilet seat device 2. The acquisition unit 131 receives various kinds of information from the toilet seat device 2. The acquisition unit 131 acquires the information detected by the toilet seat device 2. The acquisition unit 131 acquires the information, which is detected by the toilet seat device 2, regarding the defecation of the user. The acquisition unit 131 acquires the sensor information, which is detected by the toilet seat device 2, regarding the defecation of the user.

The acquisition unit 131 acquires various kinds of information from the communication terminal 20. The acquisition unit 131 receives various kinds of information from the communication terminal 20. The acquisition unit 131 acquires the information input to the communication terminal 20. The acquisition unit 131 acquires the information, which is input by the caregiver to the communication terminal 20, regarding the defecation of the user.

The determination unit 132 determines various kinds of information. The determination unit 132 determines various kinds of information by using various kinds of information stored in the storage unit 120. The determination unit 132 determines various kinds of information by using various kinds of information acquired by the acquisition unit 131.

The determination unit 132 functions as the determination device for determining the property of feces. The determination unit 132 determines the property of feces from the detection result of the toilet seat device 2. The determination unit 132 determines the fecal property of the user on the basis of the information, which is detected by the toilet seat device 2, regarding the defecation of the user. The determination unit 132 determines the fecal property of the user by appropriately using various techniques for detecting the property of the feces by an optical method. The determination unit 132 automatically determines the property of feces by dividing the property into at least three types of results corresponding to loose feces, normal feces, and hard feces.

The determination unit 132 determines whether the fecal property of the user is normal feces, loose feces, or hard feces. The determination unit 132 determines whether the fecal property of the user is normal feces, loose feces, or hard feces on the basis of the sensor information regarding the defecation of the user. The determination unit 132 determines whether the feces is normal feces, loose feces, or hard feces by appropriately using various techniques for classifying the property of feces.

The determination unit 132 may determine finer categories than the three categories of normal feces, loose feces, and hard feces. The determination unit 132 may determine four or more categories of the defecation of the user. The determination unit 132 may determine that the defecation of the user is in any of four or more categories. The determination unit 132 may determine using information regarding the Bristol scale. The determination unit 132 may classify the defecation of the user into seven categories on the basis of the Bristol scale. The determination unit 132 may determine which of the seven categories of Bristol scale the defecation of the user corresponds to.

Incidentally, the determination unit 132 is not limited to the above and may determine the property of defecation on the basis of various kinds of information. For example, the determination unit 132 may determine the defecation property of the user on the basis of the time (defecation time) required for the user to defecate. In this case, the determination unit 132 may determine the defecation property of the user by using the time until the user leaves the seating portion 5 after sitting on the seating portion 5 as the defecation time. For example, the determination unit 132 may determine that the defecation property of the user is loose feces when the defecation time is less than the first threshold value. Further, the determination unit 132 may determine that the defecation property of the user is normal feces when the defecation time is equal to or longer than the first threshold value and is less than the second threshold value (>the first threshold value). Further, the determination unit 132 may determine that the defecation property of the user is hard feces when the defecation time is equal to or longer than the second threshold value.

In this way, the determination unit 132 may determine the defecation property of the user by using various kinds of information as well as the information of the excrement of the user. Accordingly, the determination unit 132 can determine the defecation property of the user by using other information even when the information of the user's feces itself cannot be acquired.

The clocking unit 133 clocks various times. The clocking unit 133 functions as the clocking device which acquires time information indicating the date and time of feces detection. The clocking unit 133 clocks the date and time when various kinds of information are acquired. The clocking unit 133 clocks the date and time when the information regarding defecation is acquired. The clocking unit 133 clocks the date and time when defecation is performed in the toilet room R.

The prediction unit 134 predicts various kinds of information. The prediction unit 134 predicts various kinds of information by using various kinds of information stored in the storage unit 120. The prediction unit 134 predicts various kinds of information by using various kinds of information acquired by the acquisition unit 131. The prediction unit 134 predicts various kinds of information by using various kinds of information determined by the determination unit 132. The prediction unit 134 predicts the information regarding defecation at the date and time clocked by the clocking unit 133.

The prediction unit 134 makes a prediction regarding the defecation of the user. The prediction unit 134 predicts the information regarding the defecation of the user at current time on the basis of the date and time (current time) clocked by the clocking unit 133 and the history of the user stored in the history information DB 121. The prediction unit 134 predicts the probability that the user excretes at the current time. The prediction unit 134 predicts the property of feces which can be excreted by the user at the current time. The prediction unit 134 predicts the excretion probability of the user at the current time for each fecal property.

The prediction unit 134 performs various generations. The prediction unit 134 generates information (contents) indicating the prediction of excretion on the basis of the predicted information. For example, the prediction unit 134 generates information (contents) to be displayed on the communication terminal 20. For example, the prediction unit 134 appropriately uses various techniques such as Java (registered trademark) to generate a screen (image information) to be displayed. Incidentally, the prediction unit 134 may generate a screen (image information) to be displayed on the basis of the format of CSS, JavaScript (registered trademark), or HTML. Further, for example, the prediction unit 134 may generate a screen (image information) in various formats such as joint photographic experts group (JPEG), graphics interchange format (GIF), and portable network graphics (PNG).

The transmission unit 135 transmits various kinds of information. For example, the transmission unit 135 transmits various kinds of information by controlling the communication unit 110. The transmission unit 135 transmits various kinds of information to other devices via the communication unit 110. The transmission unit 135 transmits various kinds of information to the toilet seat device 2 and the communication terminal 20. The transmission unit 135 transmits various kinds of information stored in the storage unit 120 to another device. The transmission unit 135 transmits various kinds of information acquired by the acquisition unit 131 to another device. The transmission unit 135 transmits various kinds of information determined by the determination unit 132 to another device. The transmission unit 135 transmits various kinds of information predicted and generated by the prediction unit 134 to another device. The transmission unit 135 transmits various kinds of information generated by the prediction unit 134 to another device.

The transmission unit 135 transmits the information regarding feces to the communication terminal 20. The transmission unit 135 transmits the information regarding the prediction of the user excretion to the communication terminal 20. The transmission unit 135 transmits contents to the communication terminal 20. The transmission unit 135 transmits the contents generated by the prediction unit 134 to the communication terminal 20.

Incidentally, in a case where the various processes by the control unit 130 described above are performed by a predetermined application, each unit of the control unit 130 may be realized by, for example, a predetermined application. For example, various processes by the control unit 130 may be realized by the control information received from an external information processing device.

<4. Functional Configuration of Toilet Seat Device>

Figure 7:
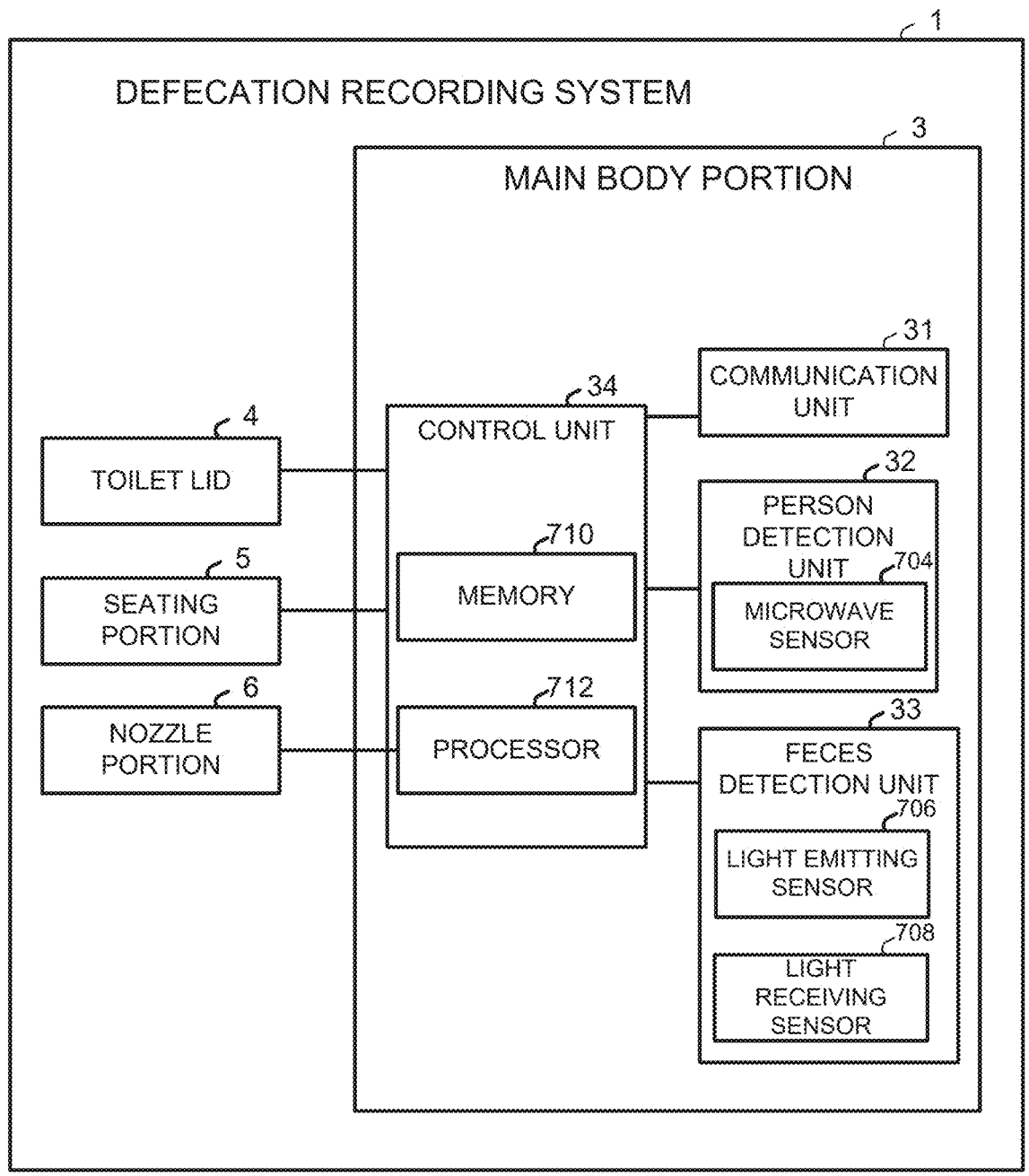
FIG. 7 is a block diagram illustrating an example of a functional configuration of a toilet seat device.

Next, the functional configuration of the toilet seat device 2 will be described with reference to FIG. 7. FIG. 7 is a block diagram illustrating an example of the functional configuration of the toilet seat device. As illustrated in FIG. 7, the toilet seat device 2 includes the main body portion 3, the toilet lid 4, the seating portion 5, and the nozzle portion 6. Incidentally, the description of the external configuration of the toilet seat device 2 described with reference to FIG. 2 will be omitted.

The main body portion 3 of the toilet seat device 2 includes a communication unit 31, a person detection unit 32, a feces detection unit 33, and a control unit 34.

The communication unit 31 is realized by, for example, a communication circuit or the like. Then, the communication unit 31 is connected to a predetermined network N by wire or wirelessly, and transmits/receives information to/from an external information processing device. For example, the communication unit 31 is connected to the network N by wire or wirelessly, and transmits/receives information to/from the operation device 10, the communication terminal 20, or the information processing device 100. The communication unit 31 transmits each information detected by the person detection unit 32 or the feces detection unit 33 to the information processing device 100. The communication unit 31 transmits the information regarding the defecation of the user detected by the feces detection unit 33 to the information processing device 100.

The person detection unit 32 performs various detections regarding a person. The person detection unit 32 performs various detections regarding the identification of the user. The person detection unit 32 functions as the user identification device. The person detection unit 32 may identify the user by using various sensors. For example, the person detection unit 32 may identify the user on the basis of the communication with various communication devices carried by the user. The person detection unit 32 may identify the user by using information for identifying the user, the information being acquired through the communication between various communication devices carried by the user and the communication unit 31 from the communication devices. The person detection unit 32 may identify the user by using the identification information (such as a user ID) of the user acquired through the communication between various communication devices carried by the user and the communication unit 31 from the communication devices. Incidentally, the above is an example, and the user may be identified by any ways as long as the user can be identified.

The person detection unit 32 performs various detections regarding the measurement of the user. The person detection unit 32 functions as the measurement device. The person detection unit 32 detects the amount of change in the weight before and after defecation. For example, the person detection unit 32 may detect the mass of the feces excreted by the user by using various sensors. For example, the person detection unit 32 may detect the mass of the feces excreted by the user by using the weight sensor provided in the toilet bowl 7.

The person detection unit 32 may detect the biometric information of the user by using various sensors. For example, the person detection unit 32 may detect the weight of the user by using various sensors. The person detection unit 32 may detect the weight of the user by a weight scale sensor (weight sensor) arranged on the floor surface F of the toilet room R. Incidentally, a function as the user identification device and a function as the measurement device may be provided outside the toilet seat device 2.

The person detection unit 32 has a function of detecting a human body. The person detection unit 32 has a human body detection sensor. For example, the person detection unit 32 is realized by a pyroelectric sensor or the like using an infrared signal. For example, the person detection unit 32 may be realized by a pyroelectric sensor or the like using a u (micro) wave sensory 704. Incidentally, the above is an example, and the person detection unit 32 may detect the human body by various ways as well as the above. For example, the person detection unit 32 detects a person (the user and the like) who enters the toilet room R (see FIG. 2). The person detection unit 32 outputs a detection signal to the control unit 34.

The person detection unit 32 has a function of detecting the person sitting on the toilet seat device 2. For example, the person detection unit 32 has a seating detection sensor. The person detection unit 32 detects that the user sits on the seating portion 5. For example, the person detection unit 32 detects that the user sits on the seating portion 5 by a load sensor. For example, the person detection unit 32 may be an infrared light emitting/receiving type ranging sensor and may detect the human body existing near the seating portion 5 or the user sitting on the seating portion 5 immediately before the person (user) sits on the seating portion 5. Incidentally, the above is an example, and the person detection unit 32 may detect the person sitting on the toilet seat device 2 by various ways as well as the above. The person detection unit 32 outputs a seating detection signal to the control unit 34.

The feces detection unit 33 performs various detections regarding excretion. The feces detection unit 33 functions as the detection device. The feces detection unit 33 detects the defecation excreted in the toilet bowl 7. The feces detection unit 33 detects the defecation excreted in the toilet bowl 7. The feces detection unit 33 may detect the information regarding the defecation of the user by using various sensors. The feces detection unit 33 may detect the feces excreted by the user by using various sensors. For example, the feces detection unit 33 may detect the feces excreted by the user by using a light emitting sensor 706 which irradiates the inside of the toilet bowl 7 with light and a light receiving sensor 708 which receives the reflection of the light emitted from the light emitting unit. For example, in the feces detection unit 33, the light emitting sensor 706 may irradiate the feces in the toilet bowl 7 with light, and the light receiving sensor 708 may detect the light reflected from the feces. The feces detection unit 33 detects the information regarding the feces excreted in the toilet bowl 7 by appropriately using various techniques for detecting the property of feces in an optical method. Incidentally, the feces detection unit 33 may have any configuration as long as the feces detection unit 33 can detect the information which allows the determination of fecal property.

The control unit 34 is the control unit which controls various configurations and processes. The control unit 34 controls the communication of the communication unit 31. The control unit 34 controls the detection of the person detection unit 32 or the feces detection unit 33.

The control unit 34 controls the toilet lid 4, the seating portion 5, and the nozzle portion 6. The control unit 34 controls the toilet lid 4, the seating portion 5, and the nozzle portion 6 on the basis of the signal transmitted from the operation device 10. The control unit 34 controls the nozzle portion 6 on the basis of the control instruction signal, which is transmitted from the operation device 10, regarding the private portion cleaning. The control unit 34 may be realized by various units such as an integrated circuit such as a CPU, an MPU, an ASIC, or an FPGA, for example a processor 712 operatively coupled to a memory 710.

<5. Processing Flow of Defecation Recording System>

Figure 8:
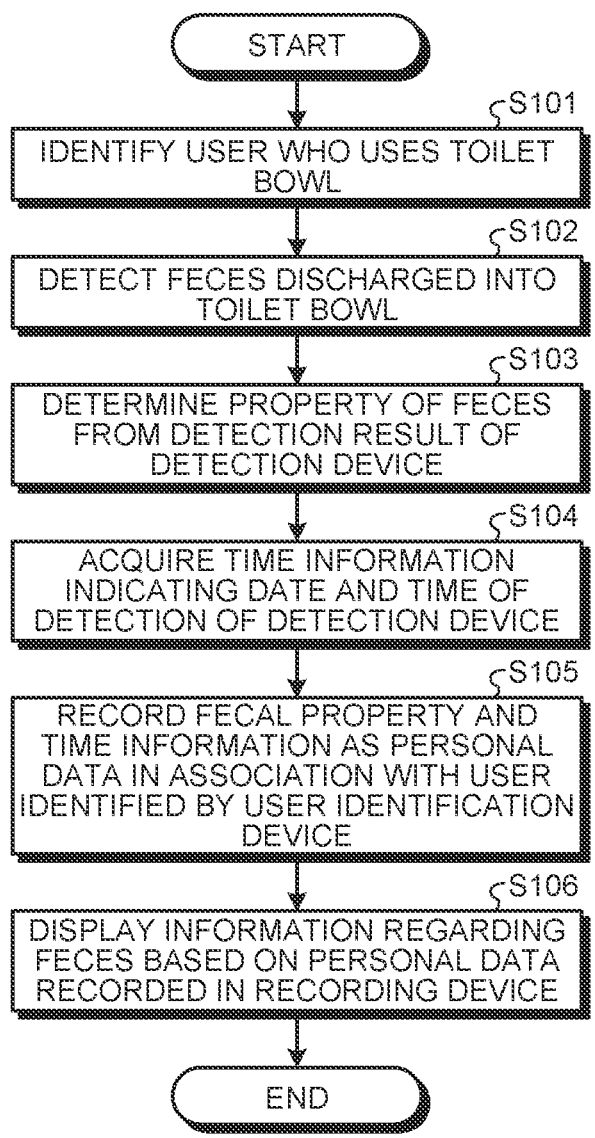
FIG. 8 is a flowchart illustrating an example of a procedure of processing executed by the defecation recording system.
Figure 9:
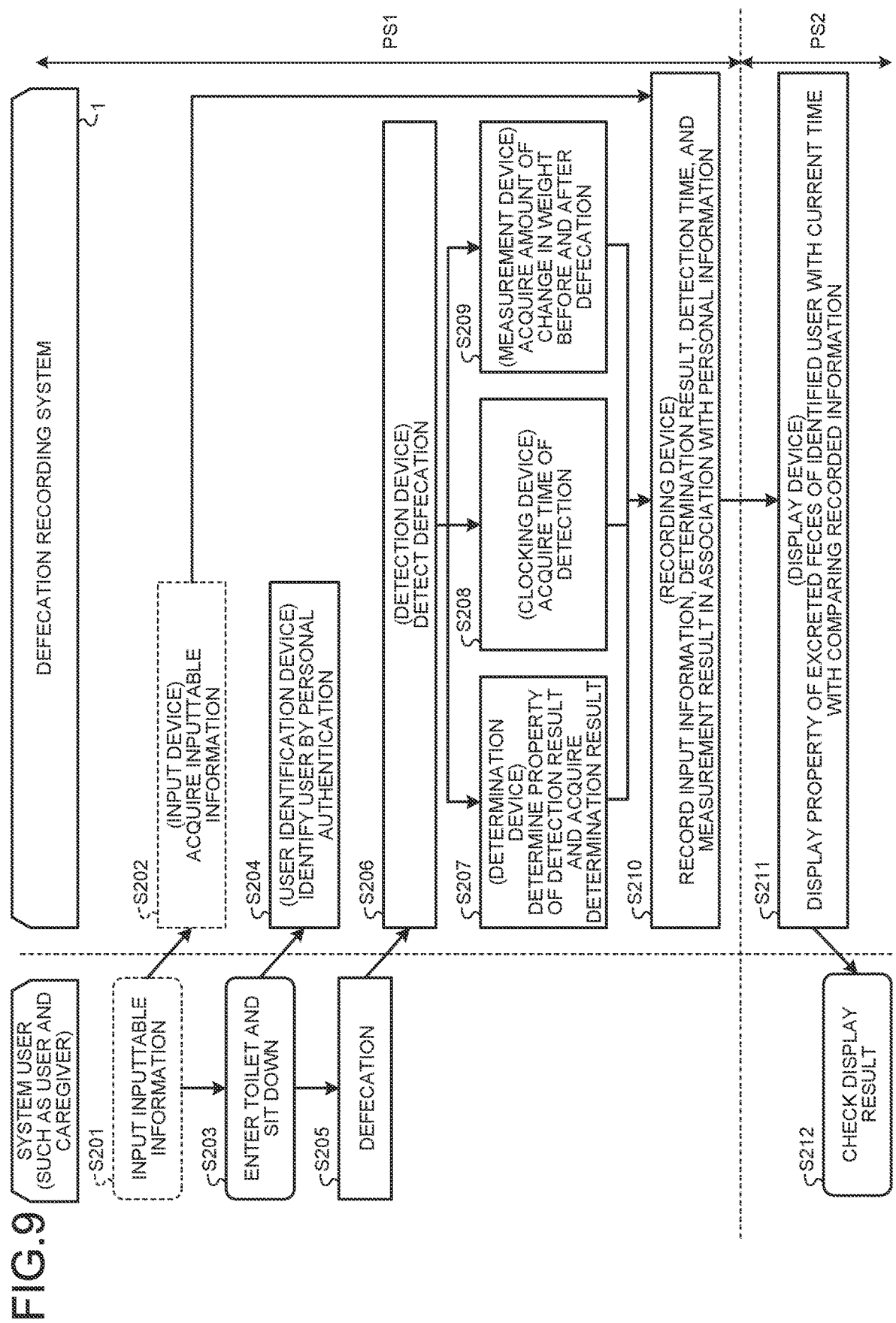
FIG. 9 is a diagram illustrating an example of information processing in the defecation recording system.

Hereinafter, the processing flow of the defecation recording system will be described with reference to FIGS. 8 and 9. FIG. 8 is a flowchart illustrating an example of the procedure of the processing executed by the defecation recording system. FIG. 9 is a diagram illustrating an example of information processing in the defecation recording system.

First, the outline of the processing flow of the defecation recording system 1 will be described with reference to FIG. 8. FIG. 8 is a flowchart illustrating an example of displaying the information regarding the defecation detected by the defecation recording system 1.

As illustrated in FIG. 8, the defecation recording system 1 identifies the user who uses the toilet bowl 7 (Step S101).

The defecation recording system 1 identifies the user by the detection of the person detection unit 32.

The defecation recording system 1 detects the feces discharged into the toilet bowl 7 (Step S102). The defecation recording system 1 detects the feces discharged into the toilet bowl 7 by the feces detection unit 33.

The defecation recording system 1 determines the property of the feces from the detection result of the detection device (Step S103). In the defecation recording system 1, the determination unit 132 determines the property of the feces from the detection result of the feces detection unit 33.

The defecation recording system 1 acquires the time information indicating the date and time when the feces is detected by the detection device (Step S104). The defecation recording system 1 acquires the date and time detected by the feces detection unit 33 from the clocking unit 133 as the time information.

The defecation recording system 1 records the fecal property and the time information as personal data in association with the user identified by the user identification device (Step S105). The defecation recording system 1 records the fecal property and the time information as personal data in association with the user identified by the person detection unit 32 in the storage unit 120 (history information DB 121).

The defecation recording system 1 displays the information regarding feces based on the personal data recorded in the recording device (Step S106). The defecation recording system 1 displays the information regarding feces based on the personal data recorded in the storage unit 120 (history information DB 121) by the communication terminal 20.

Next, the details of the processing of the processing flow of the defecation recording system 1 will be described with reference to FIG. 9. FIG. 9 is a diagram illustrating an example of the information processing, which includes the input and detection of information, executed by the defecation recording system 1.

As illustrated in FIG. 9, a system user who uses the defecation recording system 1 inputs inputtable information (Step S201). For example, the system user inputs the information (fecal incontinence information) regarding the fecal incontinence of the user, the information (drug information) regarding the laxatives or antidiarrheals taken by the user, or the information (meal information) regarding the presence or absence of meals and the meal time of the user to the communication terminal 20. In the defecation recording system 1, the caregiver or the like of the user (target person) inputs the fecal incontinence information, the drug information, or the meal information to the communication terminal 20.

Then, in the defecation recording system 1, the input device acquires the inputtable information (Step S202). The communication terminal 20 as the input device acquires the information input by the system user. The communication terminal 20 acquires the fecal incontinence information, the drug information, or the meal information. The communication terminal 20 stores the fecal incontinence information, the drug information, and the meal information in the storage device. When the communication terminal 20 transmits the fecal incontinence information, the drug information, and the meal information to the information processing device 100, the information processing device 100 stores the input information in the storage unit 120 (storage device). Incidentally, the processes of Steps S201 and S202 may not be performed or may be performed after Steps S203 to S210.

Further, the system user who uses the defecation recording system 1 enters the toilet and sits down (Step S203). In the defecation recording system 1, the user enters the toilet room R and sits down.

Then, in the defecation recording system 1, the user identification device identifies the user by personal authentication (Step S204). The person detection unit 32 as the user identification device identifies the user by personal authentication on the basis of the detection of a sensor, the communication with a communication device, or the like.

Further, the system user who uses the defecation recording system 1 defecates (Step S205). In the defecation recording system 1, the user in the toilet room R defecates in the toilet bowl 7 in the toilet room R.

Then, in the defecation recording system 1, the detection device detects the defecation (Step S206). The feces detection unit 33 as the detection device detects the defecation on the basis of the detection of a sensor or the like.

Then, in the defecation recording system 1, the determination device determines the property of the detection result and acquires a determination result (Step S207). The determination unit 132 as the determination device determines the property of the detection result and acquires a determination result.

Then, in the defecation recording system 1, the clocking device acquires the time at the time of detection (Step S208). The clocking unit 133 as the clocking device acquires the time at the time of detection.

Then, in the defecation recording system 1, the measurement device acquires the amount of change in the weight before and after defecation (Step S209). The person detection unit 32 as the measurement device acquires the amount of change in the weight before and after defecation.

Then, in the defecation recording system 1, the recording device records the input information, the determination result, the detection time, and the measurement result in association with the personal information (Step S210). The storage unit 120 as the recording device records the information input by the system user, the determination result, the detection time, and the measurement result in association with the personal information.

Processing PS1 of Steps S201 to S210 in FIG. 9 corresponds to the processing of a phase of collecting information for displaying information. In the processing PS1, the input of information and the detection of defecation may be performed a plurality of times. Further, the processing related to the detection of defecation in Steps S203 to S209 may be performed before the processing related to the input in Steps S201 and S202. Information is displayed after the processing PS1. Processing PS2 of Steps S211 and S212 in FIG. 9 corresponds to the processing of a phase of displaying information.

Then, in the defecation recording system 1, with comparing the recorded information, the display device displays the property of the excreted feces of the identified user with the current time (Step S211). The communication terminal 20 as the display device displays the information generated when the information processing device 100 compares the recorded information.

Further, the system user who uses the defecation recording system 1 checks a display result (Step S212). In the defecation recording system 1, the caregiver or the like of the user (target person) checks the display result displayed on the communication terminal 20. Then, the caregiver or the like of the user (target person) executes a process, such as guiding the user to the toilet room R, related to defecation on the basis of the display result.

<6. Information Display>

Figure 10:
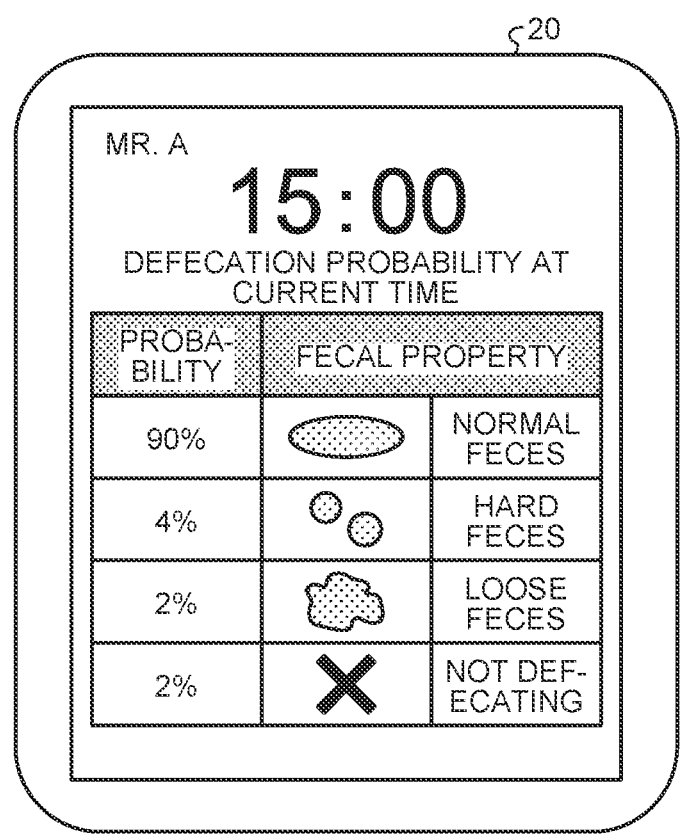
FIG. 10 is a diagram illustrating an example of a result display screen in the defecation recording system.
Figure 11:
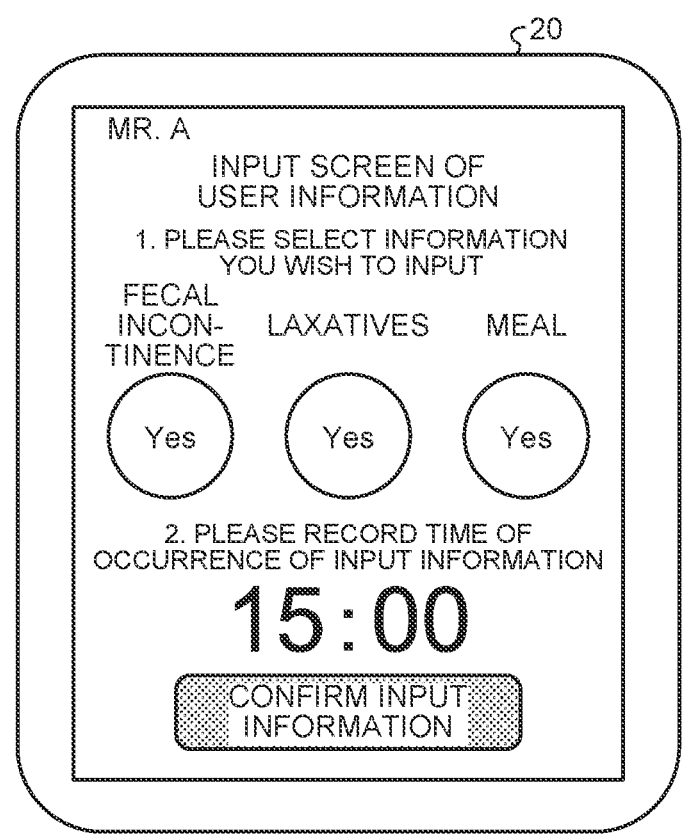
FIG. 11 is a diagram illustrating an example of an input screen in the defecation recording system.
Figure 12:
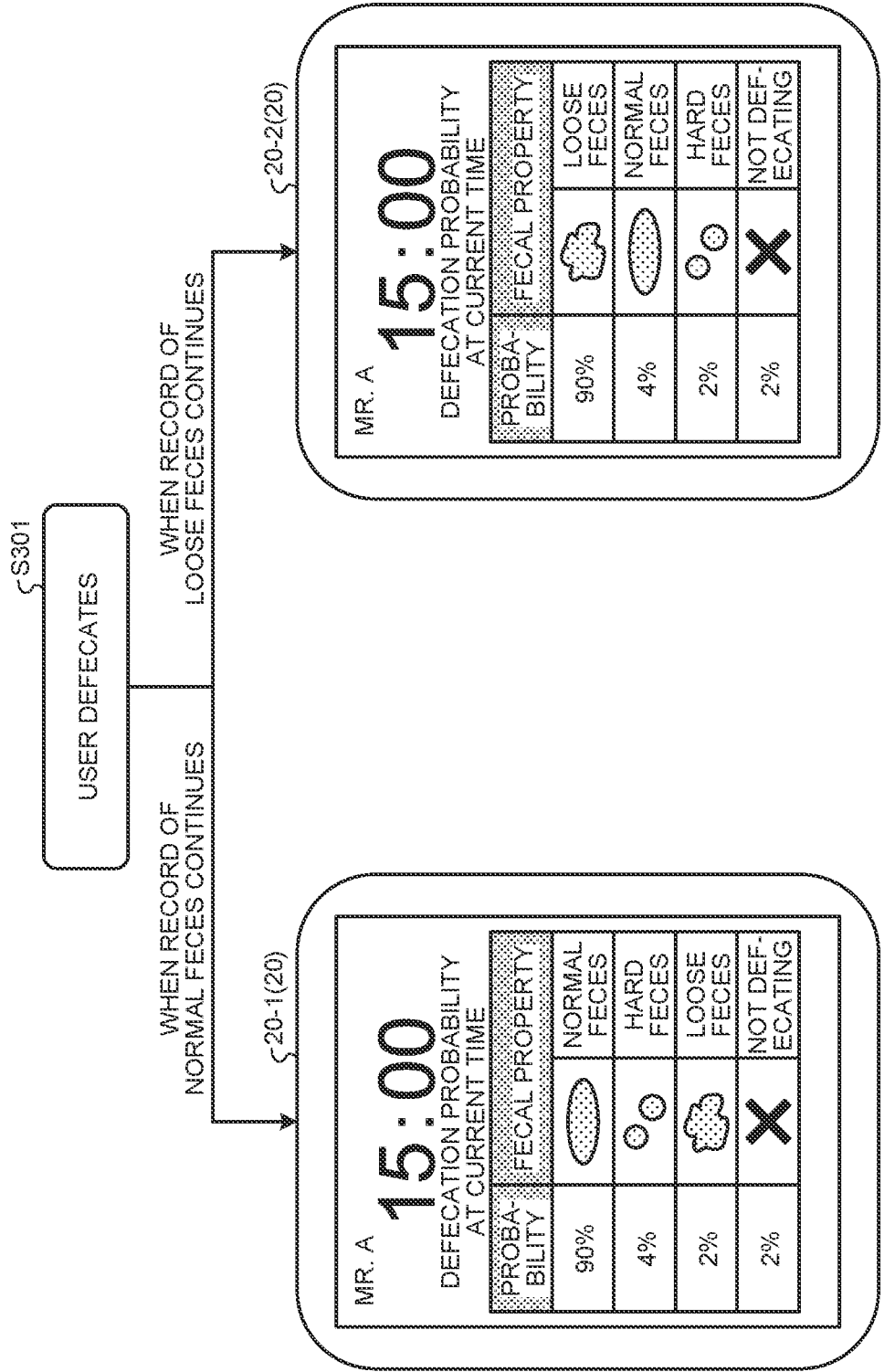
FIG. 12 is a diagram illustrating an example of a change in prediction in the defecation recording system.

Incidentally, displaying information may be performed in various modes. This point will be described with reference to FIGS. 10 to 12. FIGS. 10 to 12 illustrate examples of displaying various kinds of information on the communication terminal 20.

<6-1. Result Display>

First, a result display in the defecation recording system 1 will be described with reference to FIG. 10. FIG. 10 is a diagram illustrating an example of a result display screen in the defecation recording system.

FIG. 10 illustrates a case where the communication terminal 20 displays a prediction result for Mr. A. Specifically, the communication terminal 20 in FIG. 10 displays the defecation probability predicted for Mr. A. In the example of FIG. 10, the communication terminal 20 displays the defecation probability of Mr. A at the current time "15:00". The communication terminal 20 displays the defecation probability predicted for each fecal property including the absence of defecation.

In the example of FIG. 10, the communication terminal 20 displays prediction result information indicating that a probability of fecal property "normal feces" is "90%", a probability of fecal property "hard feces" is "4%", and a probability of fecal property "loose feces" is "2%". Further, the communication terminal 20 displays prediction result information indicating that a probability of fecal property "x", that is, not defecating is "2%". In this way, in the example of FIG. 10, for Mr. A, the communication terminal 20 displays information that a probability of excreting normal feces at that time is predicted to be considerably high.

In this way, the defecation recording system 1 displays information regarding feces based on the personal data of the user, and thus the caregiver or the like of the user can visually grasp the information regarding the feces of the user.

<6-2. Input Screen>

Next, the input screen in the defecation recording system 1 will be described with reference to FIG. 11. FIG. 11 is a diagram illustrating an example of the input screen in the defecation recording system.

FIG. 11 illustrates a case where the communication terminal 20 displays an input screen for receiving the input of information regarding Mr. A. Specifically, the communication terminal 20 in FIG. 11 displays an input screen for receiving information on fecal incontinence, drugs, and meals for Mr. A. The communication terminal 20 acquires fecal incontinence information, drug information, and meal information about Mr. A from the input screen illustrated in FIG. 11.

The caregiver or the like of Mr. A (user) who uses the communication terminal 20 inputs the information regarding any one of fecal incontinence, medicine, and meal about Mr. A and the date and time of occurrence on the input screen, and presses a button with description of "confirm input information" to complete the input. Accordingly, the communication terminal 20 acquires the input information including the date and time when any one of fecal incontinence, medicine, or meal is performed for Mr. A and the contents thereof. Accordingly, the defecation recording system 1 collects the fecal incontinence information, the drug information, and the meal information.

In this way, the defecation recording system 1 can appropriately supplement the information which is insufficient only with the detected information by collecting the input information from the caregiver or the like of the user and improve the prediction accuracy.

<6-3. Changes in Prediction Result>

Next, changes in the prediction and display of defecation in the defecation recording system 1 will be described with reference to FIG. 12. FIG. 12 is a diagram illustrating an example of a change in prediction in the defecation recording system. Incidentally, in FIG. 12, communication terminals 20-1 and 20-2 are described according to the screen displayed on the communication terminal 20. However, unless the description is particularly distinguished, the term "communication terminal 20" is simply used. Further, in the example of FIG. 12, similarly to the example illustrated in FIG. 10, a case where the current time for Mr. A is 15:00 is illustrated as an example. Incidentally, the same points as in FIG. 10 will be omitted as appropriate. For example, with respect to the information displayed on the communication terminal 20, the same points as those of the communication terminal 20 of FIG. 1 and the communication terminal 20 of FIG. 10 will be omitted as appropriate.

As described above, when the user defecates (Step S301), the defecation recording system 1 stores the information regarding the defecation and makes a prediction on the basis of the information regarding the defecation.

For example, when the recording of normal feces continues, the defecation recording system 1 predicts that a possibility that the feces of Mr. A (user) is normal feces is high. In the example of FIG. 12, when the recording of normal feces continues, the defecation recording system 1 predicts that a probability that the feces of the user is normal feces is "90%" as illustrated in the communication terminal 20-1. Further, when the recording of normal feces continues, the defecation recording system 1 predicts that a probability that the feces of the user is hard feces is "4%", and a probability that the feces of the user is loose feces is "2%". Then, in the example of FIG. 12, when the recording of normal feces continues, for each property of the feces of Mr. A (user), the communication terminal 20-1 displays the information indicating the prediction of "90%" of normal feces, "4%" of hard feces, "2%" of loose feces, and "2%" of not defecating.

On the other hand, when the recording of loose feces continues, the defecation recording system 1 predicts that a possibility that the feces of Mr. A (user) is loose feces is high. In the example of FIG. 12, when the recording of loose feces continues, the defecation recording system 1 predicts that a probability that the feces of the user is loose feces is "90%" as illustrated in the communication terminal 20-2. Further, when the recording of loose feces continues, the defecation recording system 1 predicts that a probability that the feces of the user is normal feces is "4%", and a probability that the feces of the user is hard feces is "2%". Then, in the example of FIG. 12, when the recording of loose feces continues, for each property of the feces of Mr. A (user), the communication terminal 20-2 displays the information indicating the prediction of "90%" of loose feces, "4%" of normal feces, "2%" of hard feces, and "2%" of not defecating.

In this way, the defecation recording system 1 predicts the defecation of the user on the basis of the history of the defecation of the user. Accordingly, the defecation recording system 1 can appropriately predict defecation according to the user. Thus, the defecation recording system 1 can efficiently guide the target person to the toilet and suppress an increase in the burden of nursing care related to defecation.

<7. Modification>

Incidentally, the target for recording the defecation of the user is not limited to the property of feces but may be various information related to the feces. This point will be described below as a modification. Incidentally, the same points as the above-described contents will be omitted as appropriate.

<7-1. Record of Size>

For example, the defecation recording system 1 according to the modification may record the size of the feces excreted by the user. In this case, the defecation recording system 1 determines the size of the feces of the user and records the size of the defecation of the user by using the result of the determination.

When the size of the feces of the user is recorded, the determination unit 132 of the information processing device 100 according to the modification determines the size of the feces from the detection result of the feces excreted by the user. For example, the determination unit 132 determines the size of feces from the detection result of the toilet seat device 2. The determination unit 132 determines which of a plurality of levels indicating sizes the feces excreted by the user corresponds to. For example, the determination unit 132 determines whether the size of the feces of the user is large, medium, or small from the detection result by the feces detection unit 33. The determination unit 132 automatically determines the size of the feces in three stages (levels) of large, medium, and small.

The determination unit 132 determines the feces size of the user by appropriately using various techniques for detecting the size of the feces by an optical method including an image sensor (camera) or the like. The determination unit 132 determines whether the feces size of the user is large, medium, or small on the basis of the sensor information regarding the defecation of the user. The determination unit 132 determines whether the feces size is large, medium, or small by appropriately using various techniques for classifying the size of feces. The determination unit 132 which determines the size of the feces registers the property, size, and time information of the feces as the personal data of the user in association with the user in the storage unit 120.

The above-described three sizes of large, medium, and small are only examples. The size of feces is not limited to the three stages of large, medium, and small, and the determination unit 132 may determine finer categories than the three stages (categories) of large, medium, and small. The determination unit 132 may determine four or more categories of the size of the feces of the user. The determination unit 132 may determine various categories such as five categories of levels 1 to 5 in ascending order.

Incidentally, the defecation recording system 1 may determine the size of feces by various methods as well as to the above method. For example, the defecation recording system 1 may make an automatic determination on the basis of the detection result of the optical method by using a determination unit (hereinafter referred to as "determination model") using AI (artificial intelligence) or the like installed on the cloud or the like. In this case, the determination model is caused to learn in advance by the teacher data indicating classification determination. This teacher data includes a plurality of combinations of a feces detection result and a label (correct answer information) indicating the size of the feces. For example, the determination model is a model in which the detection result of feces is input, and the information indicating the size of the feces in the input detection result is output. For example, the determination model is caused to learn to output, when the feces detection result is input, the information indicating the size of the label corresponding to the input detection result. The learning of the determination model is performed by appropriately using various methods related to so-called supervised learning.

Incidentally, the determination unit 132 may be a determination unit using AI (artificial intelligence) or the like. For example, the determination unit 132 determines the size of feces by using the above-described determination model. In this case, the determination model is stored in the storage unit 120, and the determination unit 132 may determine the size of feces by using the determination model stored in the storage unit 120. For example, the information processing device 100 may perform learning processing to generate a determination model.

<7-2. Processing Flow of Defecation Recording System>

Figure 13:
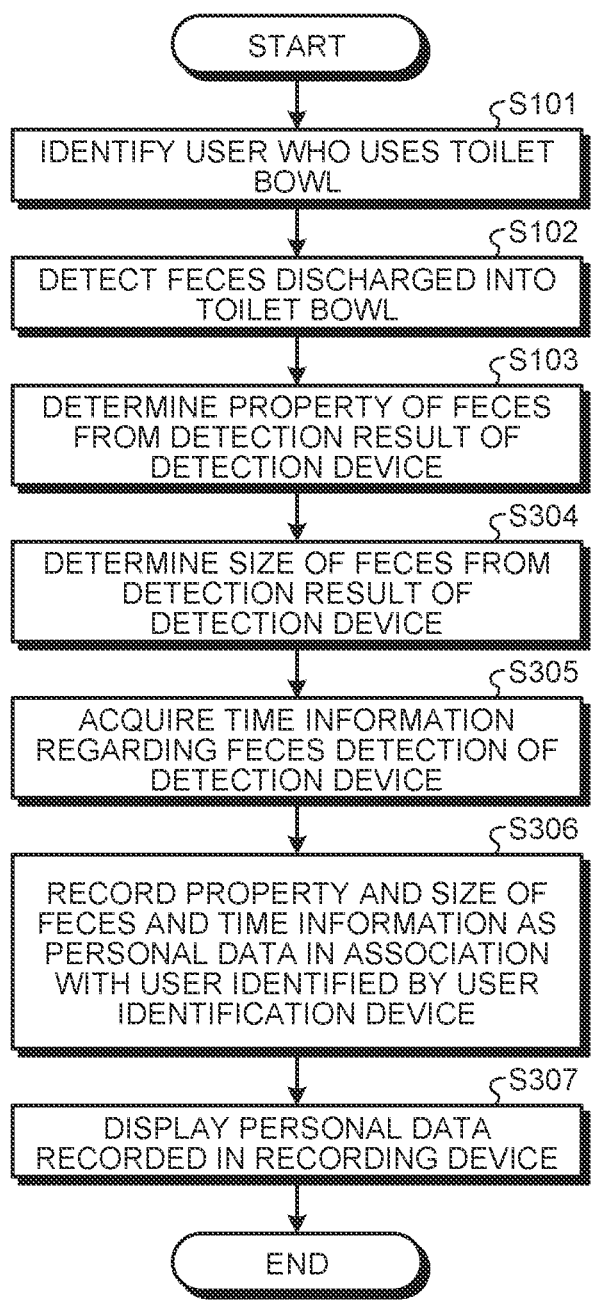
FIG. 13 is a flowchart illustrating an example of a procedure of processing executed by a defecation recording system according to a modification.

Hereinafter, the processing flow of the defecation recording system will be described with reference to FIGS. 13 and 14. FIG. 13 is a flowchart illustrating an example of the procedure of the processing executed by the defecation recording system according to the modification. FIG. 14 is a diagram illustrating an example of information processing in the defecation recording system according to the modification.

First, the outline of the processing flow of the defecation recording system 1 will be described with reference to FIG. 13. Since the processes of Steps S101 to S103 in FIG. 13 are the same as those of Steps S101 to S103 in FIG. 8, the description thereof will be omitted.

The defecation recording system 1 determines the size of feces from the detection result of the detection device (Step S304). In the defecation recording system 1, the determination unit 132 determines the size of the feces from the detection result of the feces detection unit 33. For example, the determination unit 132 of the information processing device 100 determines whether the size of the feces is large, medium, or small from the detection result by the feces detection unit 33.

The defecation recording system 1 acquires the time information indicating the date and time when the feces is detected by the detection device (Step S305). The defecation recording system 1 acquires the date and time detected by the feces detection unit 33 from the clocking unit 133 as the time information.

The defecation recording system 1 records the property and size of the feces and the time information as personal data in association with the user identified by the user identification device (Step S306). The defecation recording system 1 records the property and size of the feces and the time information as personal data in association with the user identified by the person detection unit 32 in the storage unit 120 (history information DB 121).

The defecation recording system 1 displays the information regarding feces based on the personal data recorded in the recording device (Step S307). The defecation recording system 1 displays the information regarding feces based on the personal data recorded in the storage unit 120 (history information DB 121) by the communication terminal 20.

Next, the details of the processing of the processing flow of the defecation recording system 1 will be described with reference to FIG. 14. Since the processes of Steps S201 to S209 in FIG. 14 are the same as those of Steps S201 to S209 in FIG. 9, the description thereof will be omitted.

In the defecation recording system 1, the determination device determines the size of the detection result and acquires a determination result (Step S410). The determination unit 132 as the determination device determines the size of the detection result and acquires a determination result. Incidentally, the process of Step S410 may be performed before Steps S208 and S209.

Then, in the defecation recording system 1, the recording device records the input information, the determination result, the detection time, and the measurement result in association with the personal information (Step S411). The storage unit 120 as the recording device records the information input by the system user, the determination result of the property and size of the feces, the detection time, and the measurement result in association with the personal information. Incidentally, the processing related to the detection of defecation in Steps S203 to S209 and S410 may be performed before the processing related to the input in Steps S201 and S202.

Then, in the defecation recording system 1, with comparing the recorded information, the display device displays the property and size of the excreted feces of the identified user with the current time (Step S412). The communication terminal 20 as the display device displays the information generated when the information processing device 100 compares the recorded information.

Further, the system user who uses the defecation recording system 1 checks a display result (Step S413). For example, in the defecation recording system 1, the user of the toilet bowl who defecates checks the display result displayed on the communication terminal 20. Then, the user manages his/her own health condition on the basis of the display result.

Incidentally, the defecation recording system 1 may further record other information regarding feces. For example, the defecation recording system 1 may store the color of the feces of the user. In this case, similarly to the case of the size of feces, the information processing device 100 determines which color the feces of the user corresponds to in a plurality of stages and records the information in association with the user. For example, the information processing device 100 determines the feces color of the user by appropriately using various techniques for detecting the color of the feces by an optical method including an image sensor (camera) or the like. The information processing device 100 may determine which color the feces of the user corresponds to in a plurality of stages by using the color determination model generated by the same method as the feces size determination model. Further, in the above-described example, a case where the care recipient is a user (of the toilet bowl) is described as an example, but the user is not limited to the care recipient. For example, the user may be a system user who performs his/her own health management by the recording of feces. That is, the user may be any subject as long as the user is a target person whose the defecation is put on a record.

Incidentally, it should be noted that the above-described embodiments and modifications can be appropriately combined as long as the processing contents do not contradict each other.

Further effects and modifications can be easily derived by those skilled in the art. For this reason, the broader aspects of the invention are not limited to the particular details and representative embodiments expressed and described as described above. Therefore, various modifications can be made without departing from the spirit or scope of the general concept of the invention as defined by the appended claims and their equivalents.

REFERENCE SIGNS LIST

R TOILET ROOM
1 DEFECATION RECORDING SYSTEM
2 TOILET SEAT DEVICE
3 MAIN BODY PORTION
31 COMMUNICATION UNIT
32 PERSON DETECTION UNIT (MEASUREMENT DEVICE, USER IDENTIFICATION DEVICE)
33 FECES DETECTION UNIT (DETECTION DEVICE)
34 CONTROL UNIT
4 TOILET LID
5 SEATING PORTION
6 NOZZLE PORTION
7 WESTERN-STYLE TOILET BOWL (TOILET BOWL)
8 BOWL PORTION
9 RIM PORTION
100 INFORMATION PROCESSING DEVICE
110 COMMUNICATION UNIT
120 STORAGE UNIT (STORAGE DEVICE)
121 HISTORY INFORMATION DB
130 CONTROL UNIT
131 ACQUISITION UNIT
132 DETERMINATION UNIT (DETERMINATION DEVICE)
133 CLOCKING UNIT (CLOCKING DEVICE)
134 PREDICTION UNIT
135 TRANSMISSION UNIT
20 COMMUNICATION TERMINAL (DISPLAY DEVICE, INPUT DEVICE)

The invention claimed is:

1. A defecation recording system comprising:
a toilet bowl which is installed in a toilet room;
a user identification device which identifies a user who uses the toilet bowl based on identification information acquired from a communication device carried by the user;
a feces detection unit including a light emitting sensor and a light receiving sensor which detect feces discharged into the toilet bowl, and generate image data indicating a property of feces including shape, volume, and color;
a processor operatively coupled to a non-transitory memory, the light emitting sensor, and the light receiving sensor, the processor being programmed to:
determine the property of the feces from a detection result of the feces detection unit by automatically determining the property of the feces by processing the image data of the feces from the light emitting sensor and the light receiving sensor, associating recorded defecation data with the identified user, and determining the property of the feces based on the image data of the feces including shape, volume and color to divide the property into at least three types of results corresponding to loose feces, normal feces, and hard feces; and
record the property of the feces and time information as personal data corresponding to the user identified by the user identification device; and
a communication terminal or an operation device as a terminal device which displays information regarding the feces based on the personal data recorded in the non-transitory memory and which causes a display of the personal data to differ according to a determination result of the property of the feces.

2. The defecation recording system according to claim 1, wherein
the communication terminal or operation device displays current time and displays information indicating a possibility that the identified user excretes at the current time.

3. The defecation recording system according to claim 2, wherein
the communication terminal or operation device displays information indicating the property of the feces which is possible to be excreted by the identified user.

4. The defecation recording system according to claim 1, further comprising:
an input device which inputs fecal incontinence information regarding fecal incontinence of the user, and
a storage unit which records the fecal incontinence information as the personal data in association with the identified user.

5. The defecation recording system according to claim 1, further comprising:
an input device which inputs drug information regarding laxatives or antidiarrheals taken by the user, and
a storage unit which records the drug information as the personal data in association with the identified user.

6. The defecation recording system according to claim 1, wherein the determination unit determines a size of the feces from the detection result of the detection device, and
wherein the defecation recording system further comprises a storage unit which records the size of the feces and the time information as the personal data in association with the user identified by the person detection unit.

7. The defecation recording system according to claim 1, further comprising:
a storage unit having a history information database,
an information processing device that extracts, from the history information database, history information indicating property of feces of a user in the past and the time information in accordance with a request from the user, and
the communication terminal or operation device displays the extracted history information.

* * * * *